(12) United States Patent
Zhang et al.

(10) Patent No.: US 10,857,459 B2
(45) Date of Patent: Dec. 8, 2020

(54) PROCESSING METHOD FOR DISPLAYING DATA IN CLIENT AND RELATED DEVICE

(71) Applicant: TENCENT TECHNOLOGY (SHENZHEN) COMPANY LIMITED, Shenzhen (CN)

(72) Inventors: Zhenxing Zhang, Shenzhen (CN); Ran Zhang, Shenzhen (CN); Bin Qiu, Shenzhen (CN); Zhongkang Fang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/414,279

(22) Filed: May 16, 2019

(65) Prior Publication Data

US 2019/0270008 A1   Sep. 5, 2019

Related U.S. Application Data

(63) Continuation of application No. PCT/CN2018/072980, filed on Jan. 17, 2018.

(30) Foreign Application Priority Data

Jan. 25, 2017   (CN) .......................... 2017 1 0060614

(51) Int. Cl.
*H04L 29/08* (2006.01)
*A63F 13/358* (2014.01)
*A63F 13/822* (2014.01)

(52) U.S. Cl.
CPC .......... *A63F 13/358* (2014.09); *H04L 67/10* (2013.01); *H04L 67/1095* (2013.01);
(Continued)

(58) Field of Classification Search
CPC .... A63F 13/358; H04L 67/10; H04L 67/1095
See application file for complete search history.

(56) References Cited

U.S. PATENT DOCUMENTS 10,130,891 B2 *  11/2018  Perlman ................. A63F 13/30
2014/0267429 A1    9/2014  Justice et al.
(Continued)

FOREIGN PATENT DOCUMENTS

| CN | 104915542 A | 9/2015 |
|----|-------------|--------|
| CN | 106330917 A | 1/2017 |
| CN | 106693367 A | 5/2017 |

OTHER PUBLICATIONS

The World Intellectual Property Organization (WIPO) International Search Report for PCT/CN2018/072980 dated Apr. 18, 2018 6 Pages (including translation).
(Continued)

*Primary Examiner* — Adnan M Mirza
(74) *Attorney, Agent, or Firm* — Anova Law Group, PLLC

(57) ABSTRACT

A processing method is provided for a data providing server for displaying data. The method includes receiving scenario resource data sent by an interactive application server after an interactive scenario is created; and receiving snapshot data sent by the interactive application server according to a preset snapshot period. The snapshot data is generated by the interactive application server according to a full-object status in the interactive scenario. The method also include receiving a data load request sent by a data display client; sending the scenario resource data to the data display client according to the data load request, and the snapshot data to the data display client; and sending the object interaction data to the data display client after buffering object interaction data generated by the interactive application server.

20 Claims, 9 Drawing Sheets

(52) U.S. Cl.
CPC ....... *A63F 13/822* (2014.09); *A63F 2300/534* (2013.01); *A63F 2300/807* (2013.01)

(56) References Cited

U.S. PATENT DOCUMENTS

| | | |
|---|---|---|
| 2014/0274379 A1 | 9/2014 | Justice et al. |
| 2014/0335949 A1 | 11/2014 | Overton |
| 2015/0367238 A1 | 12/2015 | Perrin et al. |
| 2019/0364075 A1* | 11/2019 | Huang .................... H04L 65/00 |

OTHER PUBLICATIONS

The European Patent Office (EPO) The Extended European Search Report for 18745479.8 dated Jul. 7, 2020, 10 Pages.
Shaikh A et al: "On demand platform for online games", IBM Systems Journal, vol. 45, No. 1, Jan. 1, 2003 (Jan. 1, 2003), pp. 7-19, XP002492825, ISSN: 0018-8670, 13 Pages.
Gorlatch Sergei et al: "Enhancing Grids for Massively Multiplayer Online Computer Games", Jan. 1, 2012 (Jan. 1, 2012), 12th European Conference on Computer Vision, ECCV 2012; [Lecture Notes in Computer Science], pp. 466-477, XP047548814, ISSN: 0302-9743 ISBN: 978-3-642-36741-0, 10 Pages.

* cited by examiner

PROCESSING METHOD FOR DISPLAYING DATA IN CLIENT AND RELATED DEVICE

RELATED APPLICATIONS

This application is a continuation application of PCT Patent Application No. PCT/CN2018/072980, filed on Jan. 17, 2018, which claims priority to Chinese Patent Application No. 201710060614.2, entitled "PROCESSING METHOD FOR DISPLAYING DATA IN CLIENT, SERVER, AND CLIENT" filed with China National Intellectual Property Administration on Jan. 25, 2017, content of all of which is incorporated by reference in its entirety.

FIELD OF TECHNOLOGY

The present disclosure relates to the field of computer technologies and, in particular, to a processing method for displaying data in a client and a related device.

BACKGROUND OF THE DISCLOSURE

In a multiplayer online battle arena (MOBA) game, players in battles generally need to buy equipment. The players are usually divided into two teams, and the two teams compete with each other in dispersed game maps. Each player controls a selected role by using an interface in the style of a real-time strategy (RTS) game. In this type of game, organization units such as common building groups, resources, and trained troops in the RTS game usually do not need to be operated, and the player can complete battles by only controlling the selected role.

In a design implementation process of the MOBA game, a method used in the existing technology is a design manner of a frame synchronization game. The frame synchronization game is different from a conventional status synchronization game, and the communication manner uses an input operation of a player as a synchronization dimension. The frame synchronization does not need to synchronize statuses, and may only synchronize operations. After each client receives an operation, the client may reach a consistent status through calculation. In this case, even if a data amount is increased, a synchronization amount is not increased accordingly.

In the MOBA game designed by using the frame synchronization, a fighting client can consume a little traffic to perform a game battle function. However, for the MOBA game designed by using the frame synchronization, a relatively long time needs to be taken to start game-battle play-back, and a longer time needs to be taken to start game-battle play-back if the game battle is started for a longer time. Specifically, in the frame synchronization game, a server buffers battle data simply according to a timestamp sequence. For example, if the server receives a battle play-back request from a client at a moment $t_1$, the server delivers data packets generated from moment 0 to $t_0$ to the client, where to is a moment earlier than $t_1$. The client starts to simulate battles from the first received data packet, and restores the battle field until the simulation is to the moment $t_0$. A larger data amount indicates a longer time required for simulating the calculation.

Assuming that a time required by the client to load resources is $\Delta t$, the speed for simulating the battle when the battle field is restored is n times a normal rendering speed, and the time at which battle play-back is initiated is $t_x$, to prevent cheating through the battle play-back, the battle play-back is available only after a period of time since the battle starts. Usually, $t_x$ is greater than 60 seconds. The client needs to complete battle simulation of the $t_x$ seconds for restoring the battle field. A response time may be represented as $t=\Delta t + t_x/n$, where $t_x \geq 60$ seconds. Assuming that the client simulates the battle at a high speed that is ten times the normal rendering speed, and the player starts battle playback when the battle can be watched after one minute since the starting, the player needs to wait for at least (6+$\Delta t$) seconds. The waiting time can be shortened only if the speed of simulating the battle can be improved when the battle field is restored. This cannot be completed by a client with relatively low calculation performance.

Therefore, in the existing technology, in a game-battle play-back solution implemented based on frame synchronization data, no matter when the player watches the battle, the client pulls all frame synchronization data packets obtained after the battle starts to the server. There exists a problem that the client needs to wait for an excessively long time after initiating the battle play-back.

The disclosed methods and systems are directed to solve one or more problems set forth above and other problems.

SUMMARY

Embodiments of the present invention provide a processing method for displaying data in a client and a related device, to save a waiting time during data displaying of a client.

According to one aspect, an embodiment of the present invention provides a processing method for a data providing server for displaying data. The method includes receiving scenario resource data sent by an interactive application server after an interactive scenario is created; and receiving snapshot data sent by the interactive application server according to a preset snapshot period. The snapshot data is generated by the interactive application server according to a full-object status in the interactive scenario. The method also include receiving a data load request sent by a data display client; sending the scenario resource data to the data display client according to the data load request, and the snapshot data to the data display client; and sending the object interaction data to the data display client after buffering object interaction data generated by the interactive application server.

According to another aspect, an embodiment of the present invention further provides a processing method for displaying data. The method includes sending, by a data display client, a data load request to a data providing server; and receiving, by the data display client, scenario resource data sent by the data providing server and creating an interactive scenario according to the scenario resource data. The scenario resource data is sent to the data providing server by an interactive application server after the interactive scenario is created. The method also includes receiving, by the data display client, snapshot data sent by the data providing server, and loading the snapshot data in the interactive scenario. The snapshot data is sent to the data providing server by the interactive application server according to a preset snapshot period, and generated according to a full-object status of the interactive scenario. The method further includes receiving, by the data display client, object interaction data sent by the data providing server, and simulating an object interaction process in the interactive scenario according to the object interaction data. The object interaction data is sent to the data providing server by the interactive application server.

According to another aspect, an embodiment of the present invention further provides processing system for displaying data. The processing system includes a data providing server and a data display client. The data display client includes a memory storing computer program instructions, and a processor coupled to the memory. When executing the computer program instructions, the processor is configured to perform: sending a data load request to a data providing server; receiving scenario resource data sent by the data providing server, and creating an interactive scenario according to the scenario resource data, the scenario resource data being sent to the data providing server by an interactive application server after the interactive scenario is created; receiving snapshot data sent by the data providing server, and loading the snapshot data in the interactive scenario, the snapshot data being sent to the data providing server by the interactive application server according to a preset snapshot period, and generated according to a full-object status of the interactive scenario; and receiving object interaction data sent by the data providing server, and simulating an object interaction process in the interactive scenario according to the object interaction data, the object interaction data being sent to the data providing server by the interactive application server.

According to another aspect, an embodiment of the present invention further provides a non-transitory computer-readable storage medium storing computer program instructions. The computer program instructions are executable by at least one processor of a data display client to perform: sending a data load request to a data providing server; receiving scenario resource data sent by the data providing server, and creating an interactive scenario according to the scenario resource data, the scenario resource data being sent to the data providing server by an interactive application server after the interactive scenario is created; receiving snapshot data sent by the data providing server, and loading the snapshot data in the interactive scenario, the snapshot data being sent to the data providing server by the interactive application server according to a preset snapshot period, and generated according to a full-object status of the interactive scenario; and receiving object interaction data sent by the data providing server, and simulating an object interaction process in the interactive scenario according to the object interaction data, the object interaction data being sent to the data providing server by the interactive application server.

BRIEF DESCRIPTION OF THE DRAWINGS

To more clearly describe technical solutions, accompanying drawings for describing the embodiments are briefly introduced below. Apparently, the following drawings are only some but not all of embodiments of the present invention, and a person skilled in the art can derive other drawings from the disclosed drawings.

DETAILED DESCRIPTION

The embodiments of the present disclosure provide a processing method for displaying data in a client and a related device, to resolve at least the problem that the client needs to wait for an excessively long time during game battle play-back.

To make the inventive objective, features, and advantages of the present disclosure more obvious and understandable, the following describes the technical solutions in the embodiments of the present disclosure with reference to the accompanying drawings. Apparently, the embodiments described below are merely some but not all of the embodiments of the present disclosure. Other embodiments obtained by a person of ordinary skill in the art based on the disclosed embodiments of the present disclosure shall fall within the protection scope of the present disclosure.

In the specification, claims, and accompanying drawings of the present disclosure, the terms "include", "contain" and any other variants thereof mean to cover the non-exclusive inclusion, so that a process, method, system, product, or device that includes a list of units is not necessarily limited to those units, but may include other units not expressly listed or inherent to such a process, method, product, or device.

Figure 1:
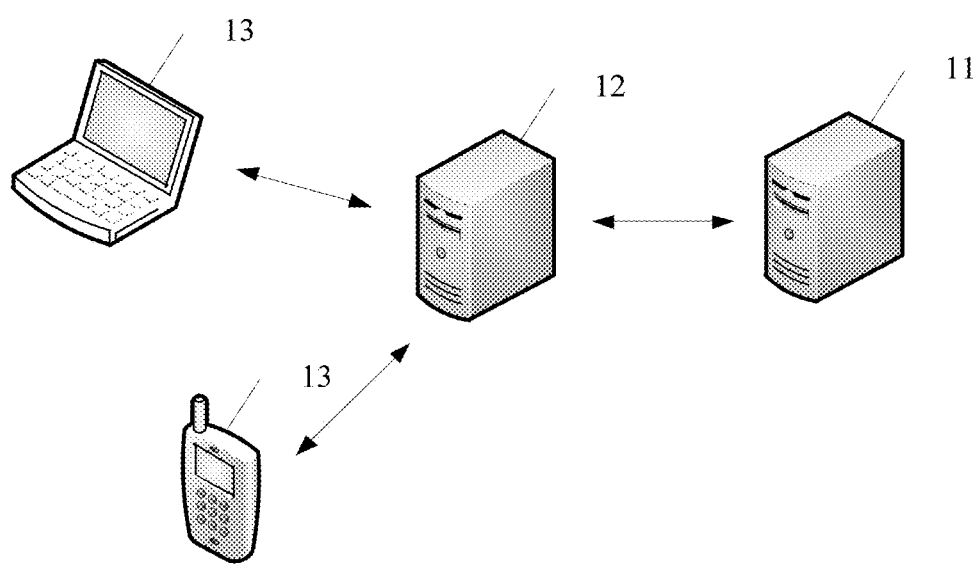
FIG. 1 is a schematic architectural diagram of a communications system according to an embodiment of the present disclosure.

The processing method for displaying data in a client provided in the embodiments of the present disclosure is applied to a communications system. Referring to FIG. 1, FIG. 1 is a schematic architectural diagram of a communications system. The communications system includes an interactive application server 11, a data providing server 12, and two data display clients 13. In one embodiment of this application, a data display client 13 includes, but is not limited to, a mobile phone, a computer, a notebook computer, a palm computer, and the like. Functions of the data providing server 12 and functions of the interactive application server 11 in one embodiment of this application may be integrated in one device, or the data providing server 12 and the interactive application server 11 may be deployed separately. In actual applications, specific implementations are not limited in this disclosure. In one embodiment of this disclosure, an example in which the data providing server 12 and the interactive application server 11 are deployed separately is used for description.

The interactive application server 11 sends data to the data providing server 12, the data display client 13 interacts with the data providing server 12, and the data providing server 12 provides the data for the data display client 13, to be locally displayed in the client. For example, in an interactive scenario, the interactive application server generates various data, and sends the data to the data display client by using the data providing server, and the data display client may locally display the data. For example, in one embodiment of the present disclosure, the interactive scenario may specifically refer to a game scenario, or may refer to an operating scenario of an application program, such as an application operating scenario of office software, or an application operating scenario of roles.

Using the game scenario as an example, a MOBA game such as League of Heroes provides an online battle play-back function, and a battle play-back client needs to wait for a long time before entering a battle play-back state at a particular moment. In one embodiment of the present disclosure, an example in which the interactive scenario is specifically a game scenario is used. The data display client 13 may be specifically a battle play-back client, the data providing server 12 may be specifically a battle play-back server, and the interactive application server 11 is specifically a game server.

The game server divides all data in the game scenario into three types: scenario resource data, snapshot data, and object interaction data. The game server and the battle play-back server maintain data synchronization. The battle play-back server receives the scenario resource data, the snapshot data, and the object interaction data from the game server. The battle play-back server sends the scenario resource data, the snapshot data, and the object interaction data sequentially to the battle play-back client, so that the battle play-back client can rapidly enter the battle play-back state locally, and display game data to users.

Figure 2:
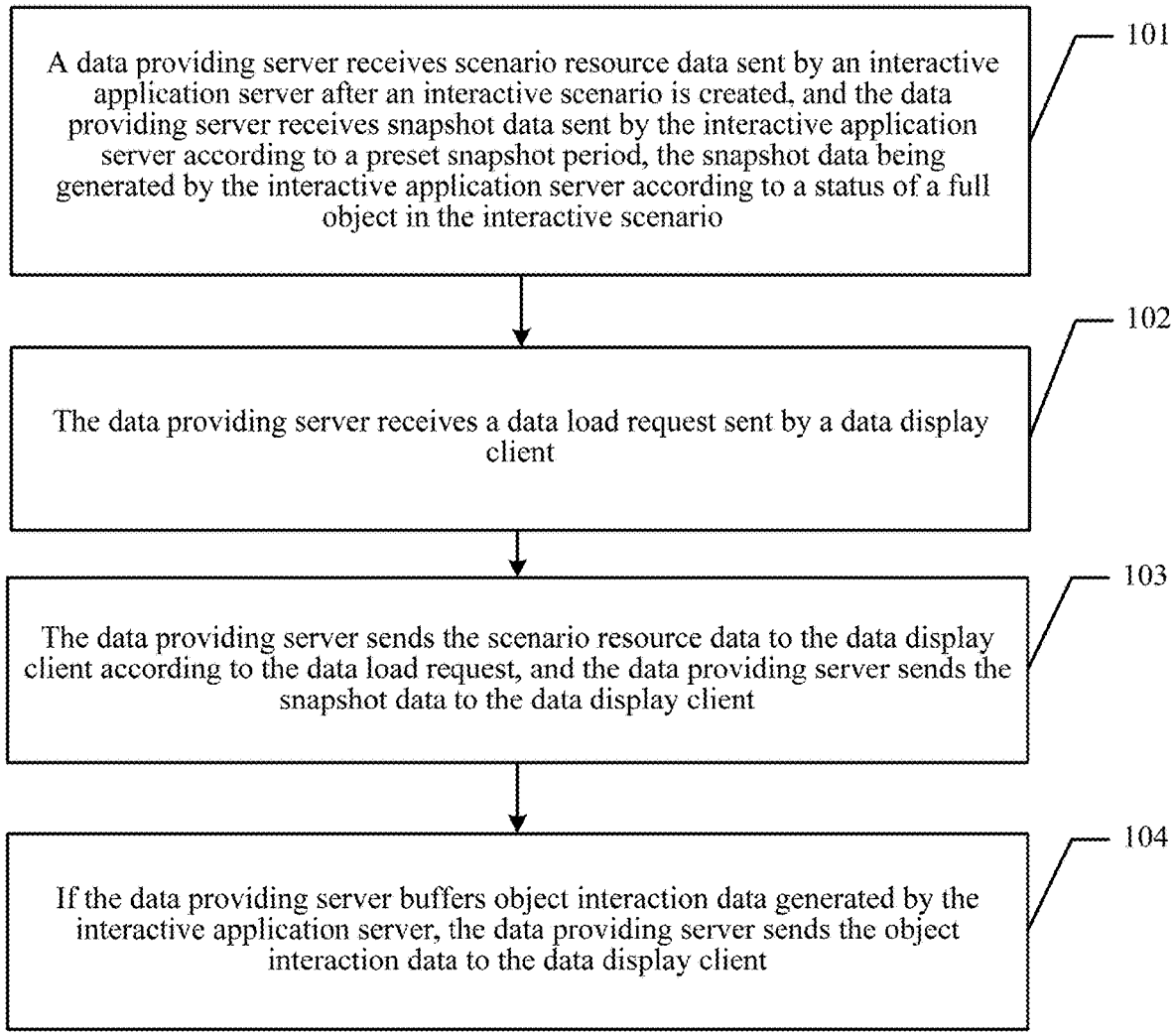
FIG. 2 is a schematic flowchart of a processing method for displaying data in a client according to an embodiment of the present disclosure.

Next, the processing method for displaying data in a client provided in the embodiments of the present disclosure is described separately from the perspective of the data providing server and the data display client. First, description is provided from the perspective of the data providing server. Referring to FIG. 2, the processing method for displaying data in a client provided in an embodiment of the present disclosure may include the followings.

101. A data providing server receives scenario resource data sent by an interactive application server after an interactive scenario is created, and the data providing server receives snapshot data sent by the interactive application server according to a preset snapshot period, the snapshot data being generated by the interactive application server according to a full-object status of in the interactive scenario.

In one embodiment of the present disclosure, the data providing server is a server providing data for a data display client, and data buffered in the data providing server is from the interactive application server. In one embodiment of the present disclosure, the interactive application server provides an interaction application function for an interactive application client. For example, the interactive scenario is specifically a game scenario or an application operating scenario. The interactive application server divides all data in the interactive scenario into three types: scenario resource data, snapshot data, and object interaction data.

The scenario resource data is pre-loaded data (which may be briefly referred to as Pre), and is basic data necessary for creating the interactive scenario. With one data load request initiated by the data display client, only one interactive scenario needs to be created. The scenario resource data is data necessary for a bottom layer of the interactive scenario. For example, by using the game scenario as an example, the scenario resource data is the data that needs to be delivered by the battle play-back client each time during battle play-back, and only needs to be loaded once for watching one battle, for the battle play-back client to load battle field resources, such as map resources, hero model resources, and monster model resources.

In one embodiment of the present disclosure, the snapshot data is generated by the interactive application server according to the status of the full object in the interactive scenario, and the interactive application server generates the snapshot data according to the preset snapshot period. Therefore, the snapshot data is also periodically sent to the data providing server by the interactive application server. The snapshot data (which may be simply referred to as Snap) is object status data generated by the interactive application server for the status of the full object in the interactive scenario. The full object refers to all objects displayed in the interactive scenario or to one or several specific objects displayed in the interactive scenario. These objects include a simulation object, a non-control object, and the like. By using the game scenario as an example, the full-object status or the status of the full object may include positions and battle attributes of objects such as fighting roles, guard towers, soldiers, and wild monsters, and equipment, money, and battle statistical data of all fighting roles. The interactive application server periodically snapshots the full object in the interactive scenario according to the snapshot period, so that status data of the full object can be obtained, and the snapshot data may be used to restore the status of the full object in the interactive scenario. For example, by using the game scenario as an example, Snap is status data of a full object in a battle field at a moment, and is used by the battle play-back client to restore a battle field state. Snap is periodically generated by a battle server (also referred to as a game server). Because the status of the full object in the battle field changes all the time, Snap generated at different moments is different.

In one embodiment of the present disclosure, the interactive application server further generates object interaction data according to an object interaction behavior in the interactive scenario. The object interaction data is real-time network uplink and downlink data, and generated after the interactive application server performs uplink and downlink interactions with the interactive application client. For example, the interactive application server generates the object interaction data in real time according to a frame synchronization interval. The object interaction data (which may be referred to as Act) generated by the interactive application server is sent to the data providing server in real time. Act is all uplink and downlink network interaction data within one frame of the battle server, and is used by the battle play-back client to simulate a battle process after restoring the battle field state. The battle server may forward the Act to the battle play-back server in real time. A difference between Snap and Act lies in: the Snap is full data, and is the basis for restoring the battle field state, and the Act may be considered as incremental data, and is the basis for simulating a battle behavior after the battle field state is restored.

In one embodiment of the present disclosure, the interactive application server provides an interactive service for the interactive application client. The interactive application server first creates the interactive scenario, generates the scenario resource data, and sends the scenario resource data to the data providing server. The interactive application server generates the snapshot data according to the preset snapshot period, and sends the snapshot data to the data providing server. Both the scenario resource data and the snapshot data are buffered in the data providing server, so that the data providing server may provide a data display service for the data display client.

102. The data providing server receives a data load request sent by the data display client.

In one embodiment of the present disclosure, when the data display client needs to locally display the interactive scenario, the data display client may send the data load request to the data providing server. The data providing server receives the data load request sent by the data display client. The data providing server may determine, according to the data load request, that a user needs to display the interactive scenario, and then the data providing server performs the subsequent step 103.

103. The data providing server sends the scenario resource data to the data display client according to the data load request, and the data providing server sends the snapshot data to the data display client.

In one embodiment of the present disclosure, the data providing server obtains the scenario resource data from the interactive application server, and obtains snapshot data generated at different snapshot generating moments with the preset snapshot period. When the data display client sends the data load request, the data providing server may immediately send the scenario resource data to the data display client, so that the data display client immediately starts to create the interactive scenario according to the scenario resource data, thereby shortening the time for the user to wait for data to be loaded. In one embodiment of the present disclosure, the data providing server further sends the snapshot data to the data display client, so that the data display client loads the snapshot data in the interactive scenario, and restores the status of the full object in the interactive scenario. Then, step 104 is performed.

In some embodiments of the present disclosure, if the data providing server receives, at a first moment, the data load request sent by the data display client, the data providing server sends the scenario resource data to the data display client according to the data load request in step 103 includes the followings.

A1. The data providing server sends the scenario resource data to the data display client in real time after receiving the data load request at the first moment.

If, in step 102, the data providing server receives, at the first moment, the data load request sent by the data display client, the data providing server sends the scenario resource data to the data display client in real time after receiving the data load request at the first moment, thereby shortening the data transmission time as much as possible, so that the data display client may start to create the interactive scenario as soon as possible. Sending the scenario resource data to the data display client in real time may mean that the data providing server starts to send the scenario resource data after receiving the data load request at the first moment.

Further, in some other embodiments of the present disclosure, the data providing server sends the snapshot data to the data display client in step 103 including the followings.

B1. The data providing server determines whether the first moment of time is a snapshot sending moment at which the interactive application server sends the snapshot data.

B2. If the first moment is the snapshot sending moment, the data providing server sends, to the data display client, the snapshot data sent by the interactive application server at the first moment.

B3. The data providing server starts to wait from the first moment if the first moment is not the snapshot sending moment, until receiving snapshot data sent by the interactive application server at a latest snapshot sending moment after the first moment.

B4. The data providing server sends, to the data display client, the snapshot data sent by the interactive application server at the latest snapshot sending moment after the first moment.

The interactive application server sends the snapshot data periodically according to the snapshot period, and a moment at which the interactive application server sends snapshot data is defined as a snapshot sending moment. A plurality of snapshot sending moments may exist according to the preset snapshot period. If the first moment is the snapshot sending moment, the data providing server receives the snapshot data sent by the interactive application server at the first moment. The data providing server may send, to the data display client, the snapshot data sent by the interactive application server at the first moment, so that the data display client loads the snapshot data in the interactive scenario as soon as possible, and restores the status of the full object in the interactive scenario.

If the first moment is not the snapshot sending moment, it indicates that the interactive application server does not send latest snapshot data at the first moment, and the data providing server starts to wait from the first moment, until receiving the snapshot data sent by the interactive application server at the latest snapshot sending moment after the first moment. If the data providing server receives the latest snapshot data, the data providing server sends, to the data display client, the snapshot data sent by the interactive application server at the latest snapshot sending moment after the first moment. For example, the snapshot period for generating the snapshot data by the interactive application server is 5 seconds. If the data providing server receives the data load request right at the 2 seconds, the data providing server needs to wait for another 3 seconds. If the data providing server receives snapshot data of next 5 seconds, the data providing server sends the snapshot data of the next 5 seconds to the data display client, so that the data display client may need to wait for a maximum of three seconds to restore the interactive scenario. Compared with the scenario restoring in a frame synchronization manner in the existing technology, the waiting time of the user is greatly shortened.

In some embodiments of the present disclosure, if the data providing server receives, at a second moment, a data load request that includes a playback moment and that is sent by the data display client, the playback moment is earlier than the second moment in time. If, in step 102, the data providing server receives, at the second moment, the data load request that includes the playback moment and that is sent by the data display client, it indicates that the data display client needs to load data at the playback moment, and the data providing server sends the snapshot data to the data display client in step 103, including the followings.

C1. The data providing server determines whether the playback moment is a snapshot sending moment at which the interactive application server sends snapshot data.

C2. If the playback moment is the snapshot sending moment, the data providing server sends, to the data display client, the snapshot data sent by the interactive application server at the playback moment.

C3. If the playback moment is not the snapshot sending moment, the data providing server starts to backtrack the time from the playback moment, finds a snapshot sending moment closest to the playback moment, and obtains snapshot data sent by the interactive application server at the snapshot sending moment closest to the playback moment.

C4. The data providing server sends, to the data display client, the snapshot data sent by the interactive application server at the snapshot sending moment closest to the playback moment.

The interactive application server sends the snapshot data periodically according to the snapshot period, and the moment of time at which the interactive application server sends snapshot data is defined as a snapshot sending moment. A plurality of snapshot sending moments may exist according to the preset snapshot period. If the playback moment is the snapshot sending moment, the data providing server buffers the snapshot data sent by the interactive application server at the playback moment The data providing server may send, to the data display client, the snapshot data sent by the interactive application server at the playback moment, so that the data display client loads the snapshot data in the interactive scenario as soon as possible, and restores the status of the full object in the interactive scenario. If the playback moment is not the snapshot sending moment, it indicates that the interactive application server does not send the snapshot data at the playback moment, and the data providing server starts to backtrack from the playback moment to find the closest snapshot sending moment, to obtain the snapshot data sent by the interactive application server at the snapshot sending moment closest to the playback moment. The data providing server sends, to the data display client, the snapshot data sent by the interactive application server at the snapshot sending moment closest to the playback moment. For example, the snapshot period for generating the snapshot data by the interactive application server is 5 seconds.

If the data display client needs to play back data at a moment, and the data providing server does not buffer the snapshot data right at the playback moment, the data providing server starts to backtrack the time from the playback moment, finds the snapshot sending moment closest to the playback moment, and obtains the snapshot data sent by the interactive application server at the snapshot sending moment closest to the playback moment. The time period obtained by subtracting the snapshot sending moment closest to the playback moment from the playback moment is the time that the data display client needs to wait for the playback. Thus, the data display client may rapidly restore the interactive scenario. Compared with the scenario restoring in a frame synchronization manner in the existing technology, the waiting time of the user is greatly shortened.

104. If the data providing server buffers object interaction data generated by the interactive application server, the data providing server sends the object interaction data to the data display client.

In one embodiment of the present disclosure, as can be known from the foregoing descriptions, the data providing server buffers the object interaction data generated by the interactive application server, and the data providing server may further send the object interaction data to the data display client, so that the data display client simulates an object interaction process in the interactive scenario according to the object interaction data, and the data display client displays the simulated object interaction process in the interactive scenario. The user may watch the simulated object interaction process. In one embodiment of the present disclosure, the interactive application server divides the data in the interactive scenario into three different types of data, and each type of data is sequentially loaded. Therefore, the data display client may rapidly restore the interactive scenario and restore interactions of simulation objects, so that the user may smoothly view interaction processes of the simulation objects in the interactive scenario, to resolve the problem in the existing technology that the client needs to wait for an excessively long time.

Further, in some other embodiments of the present disclosure, in the foregoing implementation scenarios in which step C1 to step C4 are performed, the data providing server sends the object interaction data to the data display client in step 104 including the followings.

D1. If the playback moment is the snapshot sending moment, the data providing server sends, to the data display client, object interaction data starting to be sent by the interactive application server from the playback moment.

D2. If the playback moment is not the snapshot sending moment, the data providing server sends, to the data display client, object interaction data starting to be sent by the interactive application server from the snapshot sending moment closest to the playback moment.

The interactive application server generates the object interaction data according to the object interaction behavior in the interactive scenario. The object interaction data is real-time network uplink and downlink data, and generated after the interactive application server performs uplink and downlink interactions with the interactive application client. When the data display client initiates data playback, through the determining in step C1, if the playback moment is the snapshot sending moment, the data providing server sends, to the data display client, the object interaction data starting to be sent by the interactive application server from the playback moment. If the playback moment is not the snapshot sending moment, the data providing server sends, to the data display client, the object interaction data starting to be sent by the interactive application server from the snapshot sending moment closest to the playback moment, so that the data display client may receive a plurality of pieces of object interaction data from the data providing server, and the data display client may simulate the object interaction process in the interactive scenario.

As can be known from the examples of the present disclosure by using the foregoing embodiments, in one embodiment of the present disclosure, by synchronizing a server and a client, an interactive application server sends scenario resource data and periodically generated snapshot data to a data providing server, and the data providing server sequentially sends the scenario resource data, the snapshot data, and object interaction data to a data display client, to ensure that a user can operate the data display client at any moment to initiate data display. The data display client may create an interactive scenario according to the scenario resource data after receiving the scenario resource data, may load the snapshot data in the interactive scenario after receiving the snapshot data, and may simulate an object interaction process in the interactive scenario according to the object interaction data after receiving the object interaction data. In one embodiment of the present disclosure, the interactive application server divides the data in the interactive scenario into three different types of data, and each type of data is sequentially loaded. Therefore, the data display client may rapidly restore interactions of simulation objects in the interactive scenario, so that the user may smoothly view interaction processes of the simulation objects in the interactive scenario, to resolve the problem in the existing technology that the client needs to wait for an excessively long time.

Figure 3:
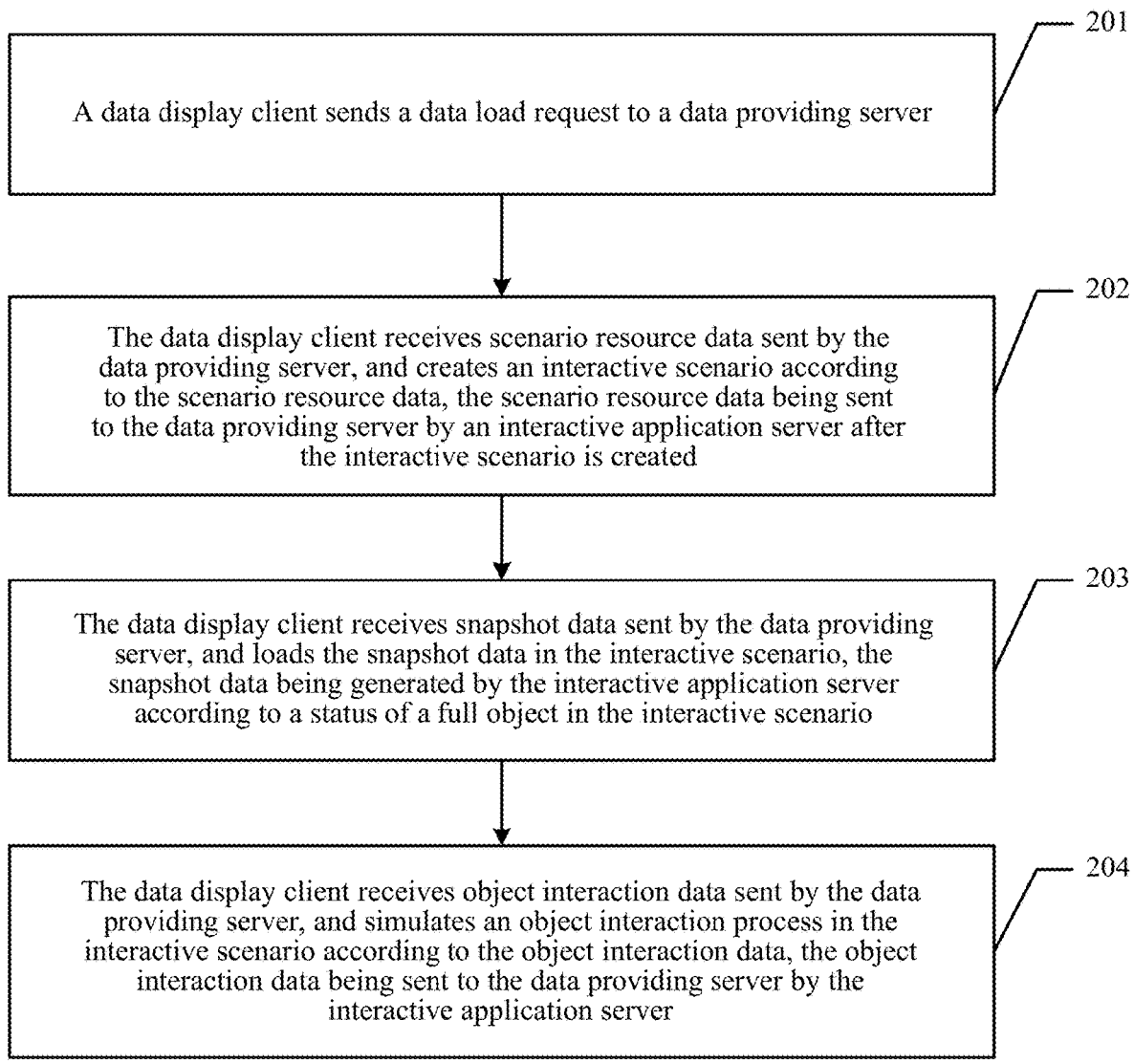
FIG. 3 is a schematic flowchart of another processing method for displaying data in a client according to an embodiment of the present disclosure.

In the foregoing embodiments, the processing method for displaying data in a client provided in the embodiments of the present disclosure is described from the perspective of the data providing server. First, the descriptions are provided from the perspective of the data display client. Referring to FIG. 3, the processing method for displaying data in a client provided in an embodiment of the present disclosure may include the followings.

201. A data display client sends a data load request to a data providing server.

In one embodiment of the present disclosure, when the data display client needs to locally display an interactive scenario, the data display client may send the data load request to the data providing server. The data providing server receives the data load request sent by the data display client, and the data providing server may determine, according to the data load request, that a user needs to display the interactive scenario.

202. The data display client receives scenario resource data sent by the data providing server, and creates an interactive scenario according to the scenario resource data, the scenario resource data being sent to the data providing server by an interactive application server after the interactive scenario is created.

In one embodiment of the present disclosure, after the data display client initiates the data load request, the data providing server obtains the scenario resource data from the interactive application server, and obtains snapshot data generated at different snapshot generating moments. When the data display client sends the data load request, the data providing server may immediately send the scenario resource data to the data display client, so that the data display client immediately starts to create the interactive scenario according to the scenario resource data, to shorten the time for the user to wait for data to be loaded.

203. The data display client receives snapshot data sent by the data providing server, and loads the snapshot data in the interactive scenario, the snapshot data being generated by the interactive application server according to the status of the full object in the interactive scenario.

In one embodiment of the present disclosure, the data providing server further sends the snapshot data to the data display client, so that the data display client loads the snapshot data in the interactive scenario, and restores the status of the full object in the interactive scenario.

In some embodiments of the present disclosure, if the data providing server receives, at a first moment, the data load request sent by the data display client, the data display client receives snapshot data sent by the data providing server in step 203, including the followings.

E1. If the first moment is a snapshot sending moment, the data display client receives, from the data providing server, the snapshot data sent by the interactive application server at the first moment.

E2. If the first moment is not the snapshot sending moment, the data display client receives, from the data providing server, snapshot data sent by the interactive application server at a latest snapshot sending moment after the first moment.

The interactive application server sends the snapshot data periodically according to the snapshot period, and the moment at which the interactive application server sends snapshot data is defined as a snapshot sending moment. A plurality of snapshot sending moments may exist according to the preset snapshot period. If the first moment is the snapshot sending moment, the data providing server receives the snapshot data sent by the interactive application server at the first moment. The data providing server may send, to the data display client, the snapshot data sent by the interactive application server at the first moment, so that the data display client loads the snapshot data in the interactive scenario as soon as possible, and restores the status of the full object in the interactive scenario. If the first moment is not the snapshot sending moment, it indicates that the interactive application server does not send latest snapshot data at the first moment, and the data providing server starts to wait from the first moment, until receiving the snapshot data sent by the interactive application server at the latest snapshot sending moment after the first moment. If the data providing server receives the latest snapshot data, the data providing server sends, to the data display client, the snapshot data sent by the interactive application server at the latest snapshot sending moment after the first moment.

In some embodiments of the present disclosure, the process of a data display client sending a data load request to a data providing server in step 201 includes the followings.

F1. The data display client sends a data load request including a playback moment to the data providing server.

The user needs to play back an interaction process of a simulation object in the interactive scenario at a moment, the data display client sends the data load request including the playback moment to the data providing server, and the data providing server receives, at a second moment, the data load request that includes the playback moment and that is sent by the data display client.

In some embodiments of the present disclosure, if the data providing server receives the data load request including the playback moment at the second moment, the data display client receives snapshot data sent by the data providing server in step 203, including the followings.

G1. If the playback moment is a snapshot sending moment, the data display client receives, from the data providing server, the snapshot data sent by the interactive application server at the playback moment.

G2. If the playback moment is not the snapshot sending moment, the data display client receives, from the data providing server, snapshot data sent by the interactive application server at a snapshot sending moment closest to the playback moment.

The interactive application server sends the snapshot data periodically according to the snapshot period, and a moment at which the interactive application server sends snapshot data is defined as a snapshot sending moment. A plurality of snapshot sending moments according to the preset snapshot period. If the playback moment is the snapshot sending moment, the data providing server buffers the snapshot data sent by the interactive application server at the playback moment. The data providing server may send, to the data display client, the snapshot data sent by the interactive application server at the playback moment, so that the data display client loads the snapshot data in the interactive scenario as soon as possible, and restores the status of the full object in the interactive scenario. If the playback moment is not the snapshot sending moment, it indicates that the interactive application server does not send the snapshot data at the playback moment, and the data providing server starts to backtrack from the playback moment to find the closest snapshot sending moment, to obtain the snapshot data sent by the interactive application server at the snapshot sending moment closest to the playback moment. The data providing server sends, to the data display client, the snapshot data sent by the interactive application server at the snapshot sending moment closest to the playback moment.

204. The data display client receives object interaction data sent by the data providing server, and simulates an object interaction process in the interactive scenario according to the object interaction data, the object interaction data being sent to the data providing server by the interactive application server.

In one embodiment of the present disclosure, the data providing server buffers the object interaction data generated by the interactive application server, and the data providing server may further send the object interaction data to the data display client, so that the data display client simulates an object interaction process in the interactive scenario according to the object interaction data, and the data display client displays the simulated object interaction process in the interactive scenario. The user may watch the simulated object interaction process. In one embodiment of the present disclosure, the interactive application server divides the data in the interactive scenario into three different types of data, and each type of data is sequentially loaded. Therefore, the data display client may rapidly restore the interactive scenario and restore interactions of simulation objects, so that the user may smoothly view interaction processes of the simulation objects in the interactive scenario, to resolve the problem in the existing technology that the client needs to wait for an excessively long time.

In some embodiments of the present disclosure, in the foregoing implementation scenarios in which step G1 and step G2 are performed, that the data display client receives object interaction data sent by the data providing server in step 204 includes:

H1. If the playback moment is the snapshot sending moment, the data display client receives, from the data providing server, the object interaction data starting to be sent by the interactive application server from the playback moment.

H2. If the playback moment is not the snapshot sending moment, the data display client receives, from the data providing server, the object interaction data starting to be sent by the interactive application server from the snapshot sending moment closest to the playback moment.

The interactive application server generates the object interaction data according to the object interaction behavior in the interactive scenario. The object interaction data is real-time network uplink and downlink data, and generated after the interactive application server performs uplink and downlink interactions with the interactive application client. When the data display client initiates data playback, if the playback moment is the snapshot sending moment, the data providing server sends, to the data display client, the object interaction data starting to be sent by the interactive application server from the playback moment, and if the playback moment is not the snapshot sending moment, the data providing server sends, to the data display client, the object interaction data starting to be sent by the interactive application server from the snapshot sending moment closest to the playback moment, so that the data display client may receive a plurality of pieces of object interaction data from the data providing server, and the data display client may simulate the object interaction process in the interactive scenario.

As can be known from the examples of the present disclosure in the foregoing embodiments, by synchronizing a server and a client, an interactive application server sends scenario resource data and periodically generated snapshot data to a data providing server, and the data providing server sequentially sends the scenario resource data, the snapshot data, and object interaction data to a data display client, to ensure that a user can operate the data display client at any time to initiate data display. The data display client may create an interactive scenario according to the scenario resource data after receiving the scenario resource data, may load the snapshot data in the interactive scenario after receiving the snapshot data, and may simulate an object interaction process in the interactive scenario according to the object interaction data after receiving the object interaction data.

In one embodiment of the present disclosure, the interactive application server divides the data in the interactive scenario into three different types of data, and each type of data is sequentially loaded. Therefore, the data display client may rapidly restore interactions of simulation objects in the interactive scenario, so that the user may smoothly view interaction processes of the simulation objects in the interactive scenario, to resolve the problem in the existing technology that the client needs to wait for an excessively long time.

For better understanding and implementing the foregoing solutions of the embodiments of the present disclosure, the following provides detailed descriptions by using a corresponding application scenario as an example.

Next, an example in which the interactive scenario is specifically a game scenario is used. The data display client may be specifically a battle play-back client (briefly referred to as a client in an example in subsequent descriptions), the data providing server may be specifically a battle play-back server, and the interactive application server is specifically a game server. The game server divides all data in the game scenario into three types: scenario resource data, snapshot data, and object interaction data. The game server and the battle play-back server remain data synchronization. The battle play-back server receives the scenario resource data, the snapshot data, and the object interaction data from the game server. The battle play-back server sequentially sends the scenario resource data, the snapshot data, and the object interaction data to the battle play-back client, so that the battle play-back client can rapidly enter a battle play-back state locally, and display game data to users.

In the existing technology, regardless of the battle playback and the playback, a relatively long time needs to be taken to restore a battle scenario at a particular time point. In one embodiment of the present disclosure, a client server (CS) is used for synchronization, and the battle server owns all data of a battle field. The battle field data of the battle server is periodically generated into the snapshot data to be sent to the battle play-back server. The battle play-back server uses snapshot delay forwarding and snapshot minimum backtracking technologies, to ensure that a player can watch and play back battles at any time. The client may obtain the snapshot data in a shortest time to restore the battle field, to smoothly watch battles. The snapshot delay forwarding is used to normally watch battles. The battle play-back client needs to restore the battle field when being connected to the battle play-back server for the first time. The battle play-back server forwards available scenario resource data and snapshot data to the client after the available scenario resource data and snapshot data arrive. The snapshot minimum backtracking is used to play back battles. When the battle play-back client selects playback at a moment, the battle play-back server backtracks to a latest available battle field before the moment to restore the snapshot and forwards the snapshot to the client, to avoid restoring the battle field from the beginning for each playback.

In one embodiment of the present disclosure, the user may enter the battle play-back at any time by using the battle play-back client, and any playback may be rapidly responded to. This significantly reduces the time for restoring the battle field, improves a response speed, and resolves the pain points of the existing technology. In the embodiments of the present disclosure, the status of the full object in the battle field scenario is used to periodically generate a data snapshot, for example, may include positions and battle attributes of objects such as fighting roles, guard towers, soldiers, and wild monsters, and equipment, money, and battle statistical data of all fighting roles, and may be used in all mobile games synchronized by using a CS network, to provide the battle play-back function. To the contrary, in a frame synchronization mobile game provided in the existing technology, the server does not have the status of the full object in the battle field, and cannot generate the data snapshot. Therefore, each time the battle field scenario is restored, the client pulls, to the server, battle data starting from the battle, and can only simulate the battle from the beginning, and there is an excessively long response time in the battle field restoring phase.

Referring to FIG. 4, FIG. 5, FIG. 6, FIG. 7, and FIG. 8, in the embodiments of the present disclosure, a snapshot data basis required for watching battles may be periodically generated by using the snapshot, battle play-back may be implemented by using snapshot delay forwarding to rapidly restore the battle field, and playback may be implemented by using snapshot minimum backtracking to rapidly restore the battle field. Next, the processes of the embodiments of the present disclosure are described by using examples.

The battle server processes interaction logics of the fighting client and processes all data in the battle field, the processing logics of the battle server are relatively complex, and the number of fighting persons that a single battle server can bear is not excessively large. In the embodiments of the present disclosure, the battle play-back server is independently disposed in addition to the battle server, interactions between the battle play-back server and the battle play-back client may be relatively simple, and a number of battle play-back persons that a single battle play-back server may bear may be very large.

In the embodiments of the present disclosure, the battle play-back function in the battle field scenario is not implemented on the battle server because the battle play-back function may reduce a bearing amount of the single battle server, and also limits the number of battle play-back players that can be simultaneously supported in one battle. In the embodiments of the present disclosure, the battle play-back server is deployed independently, the battle play-back of the battle scenario does not affect load and a deployment structure of the battle field, and the battle play-back server may be extended in parallel. In the embodiments of the present disclosure, one battle may be mapped to different battle play-back servers for players to watch, and can support massive players to watch the battle. Next, how the battle play-back server processes the scenario resource data, the snapshot data, and the object interaction data in the battle play-back scenario is described in the embodiments of the present disclosure.

Figure 4:
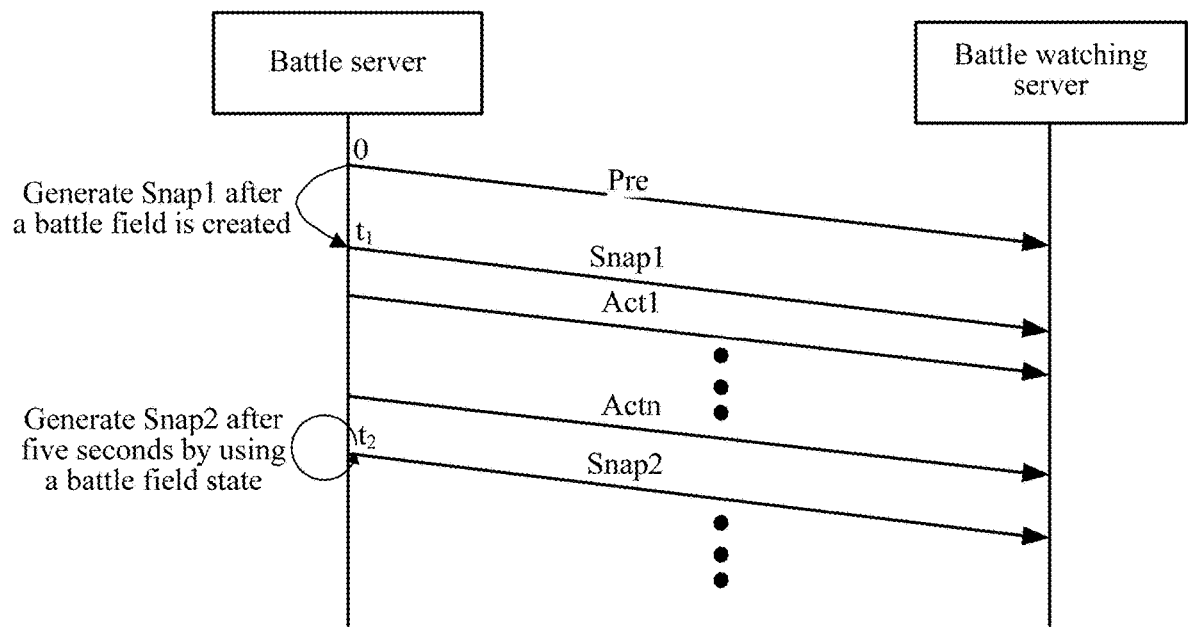
FIG. 4 is a schematic diagram of an interaction process between a data providing server and an interactive application server according to an embodiment of the present disclosure.
Figure 5:
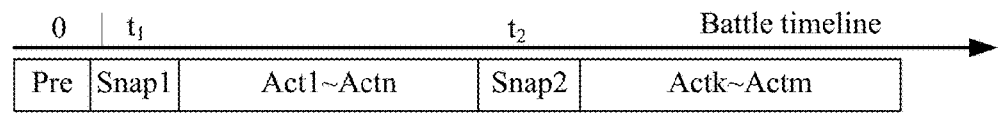
FIG. 5 is a schematic diagram of a storage structure of scenario resource data, two pieces of snapshot data, and object interaction data according to an embodiment of the present disclosure.

First, the process for generating the scenario resource data and the snapshot data is described. As shown in FIG. 4 and FIG. 5, data buffered by the battle play-back server from the battle server includes: scenario resource data Pre, snapshot data Snap1 and Snap2, object interaction data Act1-Actn generated after Snap1 is generated, and object interaction data Actk-Actm generated after Snap2 is generated. In the foregoing battle field data type, Pre is pre-loaded data, and Pre is scenario resource data that needs to be delivered in any case during battle play-back, and only needs to be loaded once for one battle play-back process, for the battle play-back client to load battle field resources, such as map resources, hero model resources, and monster model resources. Snap is status data of the full object in the battle field at a moment, and used by the client to restore the battle field state. A Snap packet is periodically generated by the battle server. Because the status of the full object in the battle field changes all the time, Snap generated at different moments is different. Act is all uplink and downlink network interaction data within one frame of the battle server, and is used by the client to simulate the battle process after restoring the battle field state. The battle server forwards Act to the battle play-back server in real time. A difference between Snap and Act lies in: the Snap is full data, and is a basis for restoring the battle field state, and the Act may be considered as incremental data, and is a basis for simulating a battle behavior after the battle field state is restored.

As shown in FIG. 4, the battle server sends a Pre packet to the battle play-back server when the battle starts, generates a first Snap packet after the battle field is created, and then generates one Snap packet every 5 seconds by using the status of the full object in the battle field. Act packets are successively forwarded between two pieces of Snap. The battle play-back server receives the data packet sent by the battle server and then buffers the data packet according to a timestamp.

Figure 6:
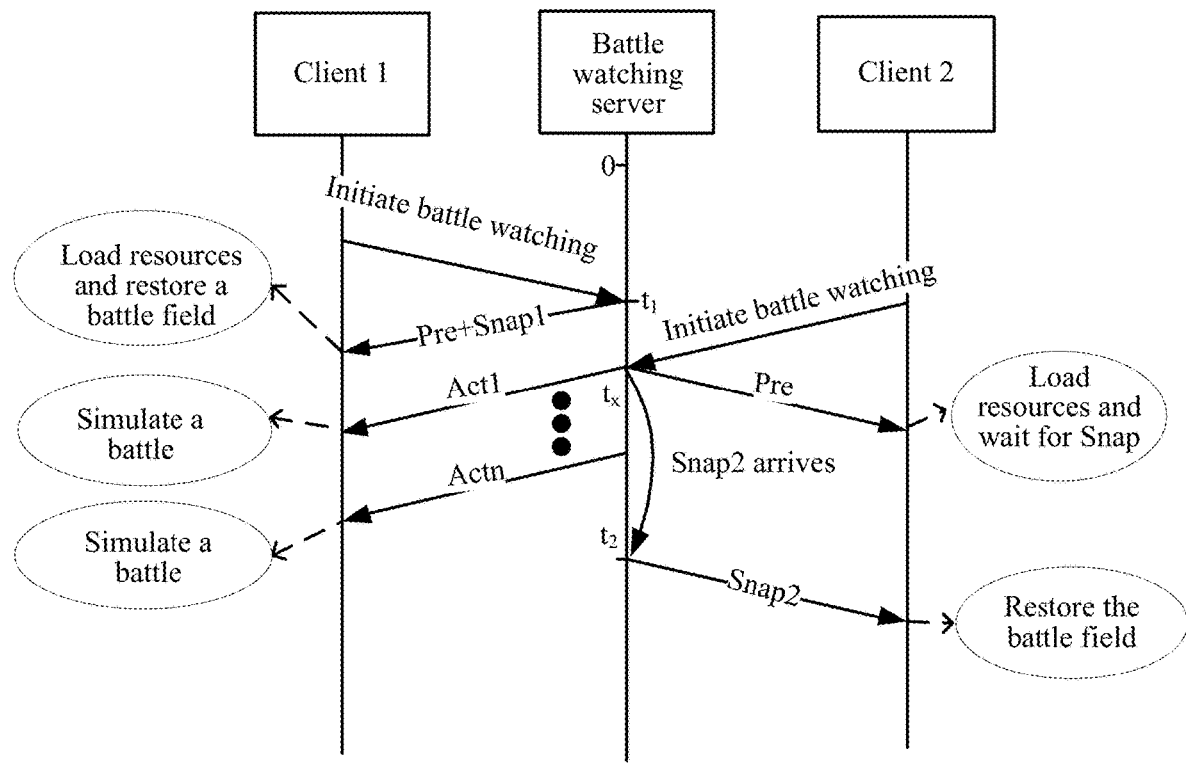
FIG. 6 is a schematic diagram of an interaction process between a data providing server and two data display clients according to an embodiment of the present disclosure.
Figure 7:
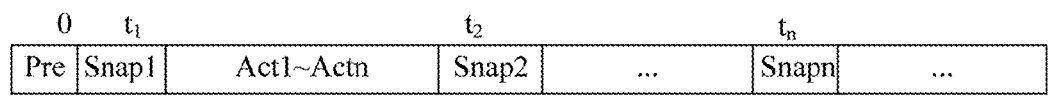
FIG. 7 is a schematic diagram of a storage structure of scenario resource data, n pieces of snapshot data, and object interaction data according to an embodiment of the present disclosure.

Next, the process for the two clients to separately request battle play-back from the battle play-back server is described. The battle play-back server receives the Snap packet from the battle server and forwards the Snap packet. As shown in FIG. 6 and FIG. 7, data buffered by the battle play-back server from the battle server includes: scenario resource data Pre, snapshot data Snap1, Snap2, . . . , and Snap-n, and object interaction data generated after each Snap is generated, for example, object interaction data Act1 to Act-n generated after Snap1 is generated. The client rapidly restores the battle field by using the Snap packet, and separately simulates two situations: there is a Snap packet and there is no Snap packet when the battle play-back is initiated. In a battle play-back scenario in a normal time sequence, when receiving a battle play-back request of the client, the battle play-back server immediately returns Pre, and marks the client as a Snap waiting state. The client starts to load the battle field resources after receiving the Pre packet.

Situation 1: when the battle is watched or played back at a moment $t_1$, the battle play-back server just receives Snap1 generated by the battle server, and directly sends Snap1 to the client. Subsequently, the client does not need to restore the battle field state, and therefore, only sends Act but no longer sends Snap. The client only needs to parse the Snap packet after the resource is loaded completely, and restores an object state in the battle field. Because a time for creating the battle field by the client after the resources are prepared may be omitted, a response time for simulating the battle field restoring in this situation is only a time t=Δt required by parsing the Pre packet and loading the battle field resources, where Δt is a time required by the client to load resources.

Situation 2: When the battle is watched at a moment $t_x$, the battle play-back server does not receive Snap generated by the battle server, and makes the client maintain a waiting state. During this period, the client remains on a pre-load interface. When Snap2 arrives, the battle play-back server forwards Snap2 to the client. In this situation, the client may wait for a maximum of 5 seconds to obtain an available Snap packet, and a response time for restoring the battle field depends on which is more time-consuming between waiting for Snap and parsing the Pre packet to load battle field resources, and may be represented as t=Max(Δt,5).

In the frame synchronization solution of the existing technology, a response time for restoring the battle field at the moment $t_x$ is in direct proportion to $t_x$. Compared with the existing technology, in the embodiments of the present disclosure, when the battle is watched at any time, the response time for restoring the battle field only changes slightly, and is faster than a response time in the existing frame synchronization solution.

Figure 8:
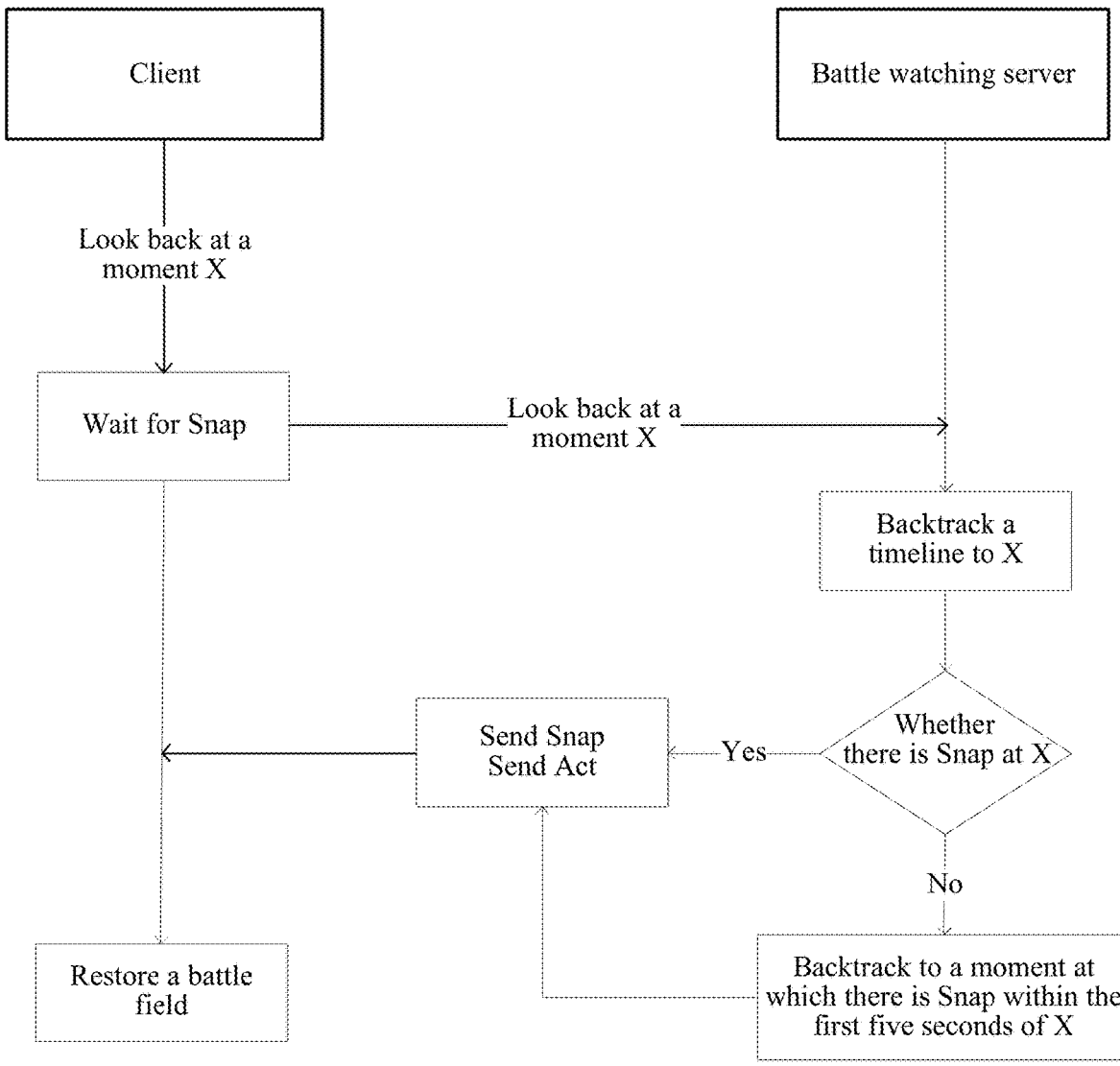
FIG. 8 is a schematic flowchart of implementing data playback by a data display client according to an embodiment of the present disclosure.

Next, the scenario in which the client initiates a playback request in the embodiments of the present disclosure is described. Referring to FIG. 8, in the embodiments of the present disclosure, a waiting time for the user to play back the battle is reduced by using a Snap packet minimum backtracking manner. An implementation process of the rapid playback of the Snap packet is as follows: The battle play-back client needs to request playing back the battle at a moment x, and the battle play-back server first backtracks to the moment x to check buffer data. If the Snap packet exists, the Snap packet is directly returned to the client, and Act packets close to the Snap packet are sequentially pushed. If there is no Snap packet at the moment x, as can be known according to the foregoing snapshot data buffer mechanism, Snap definitely exists within the first 5 seconds of the moment x. This means that the battle play-back server may only need to backtrack a maximum of 5 seconds to find the Snap packet, then set a timeline back to the moment, and return Snap and Act to the client. Similar to the battle play-back, in a playback operation, once the battle field state is restored, no Snap needs to be sent to the client.

In the embodiments of the present disclosure, during the playback, the battle play-back client does not need to re-load resources, so that once the Snap packet is received, the battle field may be restored immediately, and the response time is almost 0. For the situation in which there is no Snap packet at the moment x, the client only needs to simulate several more seconds of battle to restore the battle field at the moment x. Assuming that the simulation is also performed at n times of the original speed, a maximum response time t≈5/n. Compared with a linear response time in the existing frame synchronization playback solution, obviously, less time is used in the embodiments of the present disclosure.

In the solution of the existing technology, a playback response time is also in direct proportion to a playback time point. A more extreme situation is assumed: The players may be particularly interested in a specific battle process, and watch the battle repeatedly within a period of time. As can be known based on the foregoing descriptions, more playback times requires more extra time for waiting for restoring the battle field. In this case, the playback function is basically unavailable, and this is a main reason why many games supporting battle play-back in sequence do not provide the playback function.

In the embodiments of the present disclosure, by using forwarding and backtracking of the data snapshot of the battle field, the response time for battle play-back in the MOBA game is reduced from a linear increase of the frame synchronization solution to a quite small stable time, thereby fundamentally resolving the problem of being not flexible and smooth sufficiently because it needs to wait for a long time to restore the battle field when the battle is being watched and played back.

In the embodiments of the present disclosure, the players endure some traffic consumption during battle play-back. Therefore, no battle play-back data needs to be buffered in the battle play-back client on design of battle play-back and playback, and performance consumption of the client is reduced, so that as many clients as possible can be adapted to the design. However, based on the design principle of the present disclosure, a design in which the battle play-back client is used to locally buffer the snapshot data received from the battle play-back server, so that during playback, interactions between the battle play-back client and the battle play-back server may be reduced to some extent, that is, the snapshot backtracking solution provided in the embodiments of the present disclosure.

It should be noted that, for ease of description, the foregoing method embodiments are described as a series of action combinations. However, a person skilled in the art should understand that the present disclosure is not limited to the described sequence of the actions, because some steps may be performed in another sequence or performed at the same time according to the present disclosure. In addition, a person skilled in the art should also know that all the embodiments described in this specification are preferred embodiments, and the related actions and modules are not necessarily required in the present disclosure.

To better implement the foregoing solutions in the embodiments of the present disclosure, the following further provides related apparatuses configured to implement the foregoing solutions.

Figure 9:
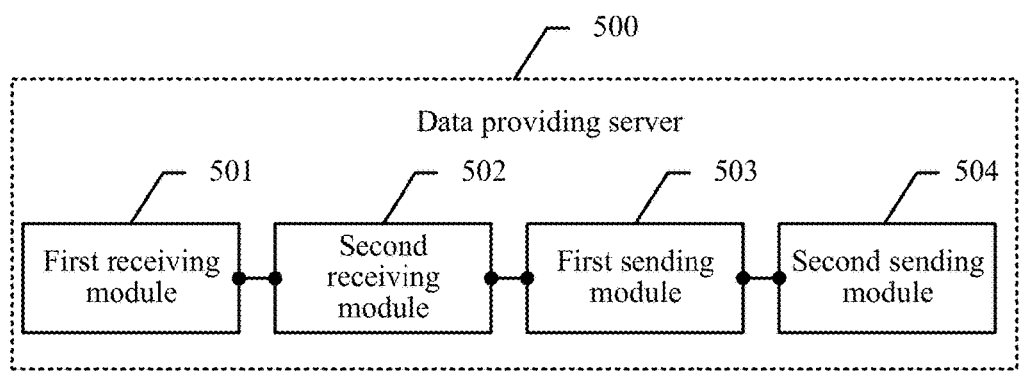
FIG. 9 is a schematic diagram of a composition structure of a data providing server according to an embodiment of the present disclosure.

Referring to FIG. 9, a data providing server 500 provided in an embodiment of the present disclosure may include: a first receiving module 501, a second receiving module 502, a first sending module 503, and a second sending module 504.

The first receiving module 501 is configured to: receive scenario resource data sent by an interactive application server after an interactive scenario is created, and receive snapshot data sent by the interactive application server according to a preset snapshot period, the snapshot data being generated by the interactive application server according to a status of a full object in the interactive scenario.

The second receiving module 502 is configured to receive a data load request sent by a data display client.

The first sending module 503 is configured to: send the scenario resource data to the data display client according to the data load request, and send the snapshot data to the data display client.

The second sending module 504 is configured to send, if the data providing server buffers object interaction data generated by the interactive application server, the object interaction data to the data display client.

In some embodiments of the present disclosure, if the data providing server receives, at a first moment, the data load request sent by the data display client, the first sending module 503 is specifically configured to send the scenario resource data to the data display client in real time after the data load request is received at the first moment.

Figure 10:
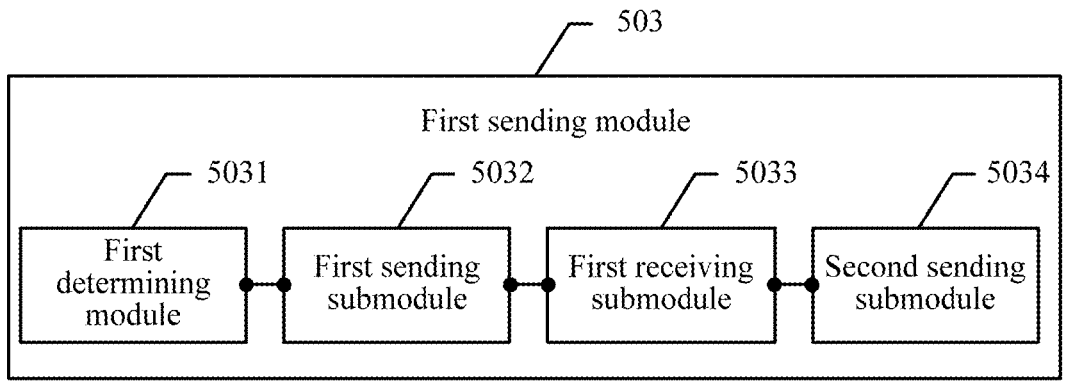
FIG. 10 is a schematic diagram of a composition structure of a first sending module according to an embodiment of the present disclosure.

In some embodiments of the present disclosure, referring to FIG. 10, the first sending module 503 includes: a first determining module 5031, a first sending submodule 5032, a first receiving submodule 5033, and a second sending submodule 5034.

The first determining module 5031 is configured to determine whether the first moment is a snapshot sending moment at which the interactive application server sends snapshot data. The first sending submodule 5032 is configured to send, if the first moment is the snapshot sending moment, to the data display client, the snapshot data sent by the interactive application server at the first moment. The first receiving submodule 5033 is configured to start to wait from the first moment if the first moment is not the snapshot sending moment, until receiving snapshot data sent by the interactive application server at a latest snapshot sending moment after the first moment. The second sending submodule 5034 is configured to send, to the data display client, the snapshot data sent by interactive application server at the latest snapshot sending moment after the first moment.

Figure 11:
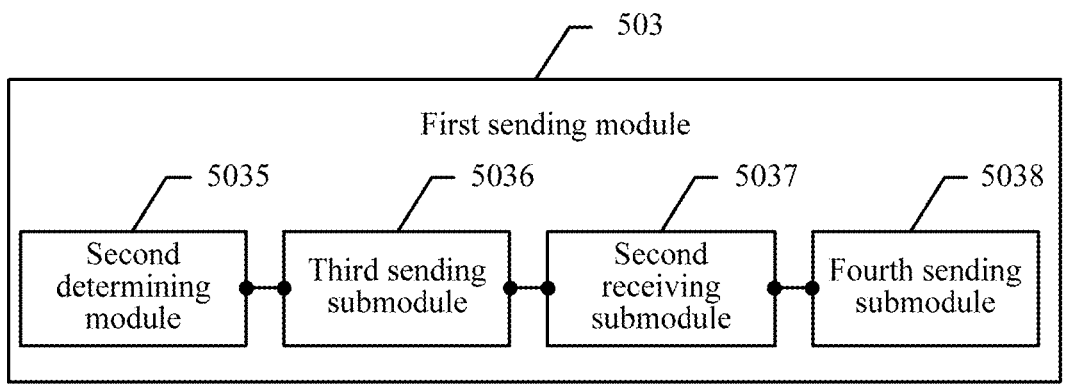
FIG. 11 is a schematic diagram of a composition structure of another first sending module according to an embodiment of the present disclosure.

In some embodiments of the present disclosure, if the data providing server receives, at a second moment, a data load request that includes a playback moment and that is sent by the data display client, the playback moment is earlier than the second moment in time. Referring to FIG. 11, the first sending module 503 includes: a second determining module 5035, a third sending submodule 5036, a second receiving submodule 5037, and a fourth sending submodule 5038.

The second determining module 5035 is configured to determine whether the playback moment is a snapshot sending moment at which the interactive application server sends snapshot data. The third sending submodule 5036 is configured to send, if the playback moment is the snapshot sending moment, to the data display client, the snapshot data sent by the interactive application server at the playback moment.

The second receiving submodule 5037 is configured to start, if the playback moment is not the snapshot sending moment, to backtrack a time from the playback moment, find a snapshot sending moment closest to the playback moment, and obtain snapshot data sent by the interactive application server at the snapshot sending moment closest to the playback moment. The fourth sending submodule 5038 is configured to send, to the data display client, the snapshot data sent by the interactive application server at the snapshot sending moment closest to the playback moment.

Figure 12:
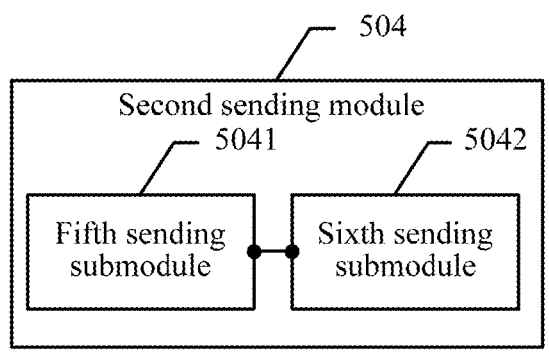
FIG. 12 is a schematic diagram of a composition structure of a second sending module according to an embodiment of the present disclosure.

In some embodiments of the present disclosure, referring to FIG. 12, the second sending module 504 includes: a fifth sending submodule 5041 and a sixth sending submodule 5042.

The fifth sending submodule 5041 is configured to send, if the playback moment is the snapshot sending moment, to the data display client, object interaction data starting to be sent by the interactive application server from the playback moment. The sixth sending submodule 5042 is configured to send, if the playback moment is not the snapshot sending moment, to the data display client, object interaction data starting to be sent by the interactive application server from the snapshot sending moment closest to the playback moment.

As can be known from the foregoing descriptions for the embodiments of the present disclosure, by means of a manner for synchronizing a server and a client, an interactive application server sends scenario resource data and periodically generated snapshot data to a data providing server, and the data providing server sequentially sends the scenario resource data, the snapshot data, and object interaction data to a data display client, to ensure that a user can operate the data display client at any time to initiate data display. The data display client may create an interactive scenario according to the scenario resource data after receiving the scenario resource data, may load the snapshot data in the interactive scenario after receiving the snapshot data, and may simulate an object interaction process in the interactive scenario according to the object interaction data after receiving the object interaction data. In one embodiment of the present disclosure, the interactive application server divides the data in the interactive scenario into three different types of data, and each type of data is sequentially loaded. Therefore, the data display client may rapidly restore interactions of simulation objects in the interactive scenario, so that the user may smoothly view interaction processes of the simulation objects in the interactive scenario, to resolve the problem in the existing technology that the client needs to wait for an excessively long time.

Figure 13:
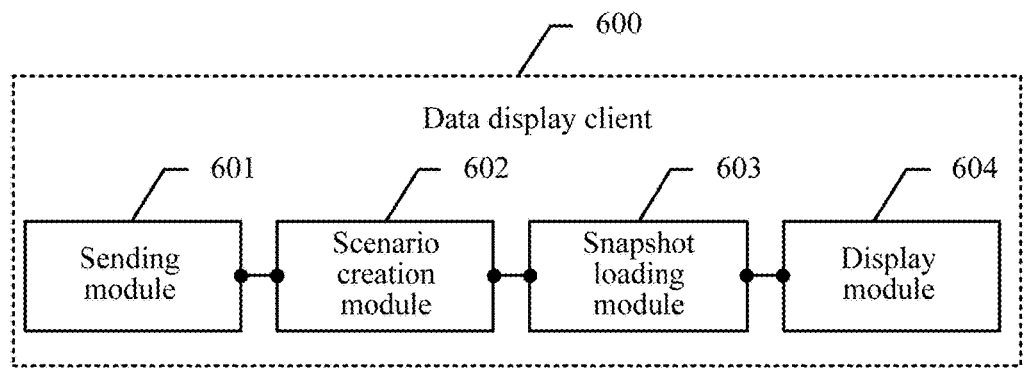
FIG. 13 is a schematic diagram of a composition structure of a data display client according to an embodiment of the present disclosure.

Referring to FIG. 13, a data display client 600 provided in an embodiment of the present disclosure may include: a sending module 601, a scenario creation module 602, a snapshot loading module 603, and a display module 604.

The sending module 601 is configured to send a data load request to a data providing server.

The scenario creation module 602 is configured to: receive scenario resource data sent by the data providing server, and create an interactive scenario according to the scenario resource data, the scenario resource data being sent to the data providing server by an interactive application server after the interactive scenario is created.

The snapshot loading module 603 is configured to: receive snapshot data sent by the data providing server, and load the snapshot data in the interactive scenario, the snapshot data being generated by the interactive application server according to a status of a full object in the interactive scenario.

The display module 604 is configured to: receive object interaction data sent by the data providing server, and simulate an object interaction process in the interactive scenario according to the object interaction data, the object interaction data being sent to the data providing server by the interactive application server.

In some embodiments of the present disclosure, if the data providing server receives, at a first moment, the data load request sent by the data display client, the snapshot loading module 603 is specifically configured to: receive, if the first moment is a snapshot sending moment, from the data providing server, snapshot data sent by the interactive application server at the first moment; and receive, if the first moment is not the snapshot sending moment, from the data providing server, snapshot data sent by the interactive application server at a latest snapshot sending moment after the first moment.

In some embodiments of the present disclosure, the sending module 601 is specifically configured to send a data load request including a playback moment to the data providing server.

If the data providing server receives the data load request including the playback moment at a second moment, the snapshot loading module 603 is specifically configured to: receive, if the playback moment is the snapshot sending moment, from the data providing server, the snapshot data sent by the interactive application server at the playback moment; and receive, if the playback moment is not the snapshot sending moment, from the data providing server, snapshot data sent by the interactive application server at a snapshot sending moment closest to the playback moment, the latest snapshot sending moment being earlier than the playback moment.

In some embodiments of the present disclosure, the display module 604 is specifically configured to: receive, if the playback moment is the snapshot sending moment, from the data providing server, object interaction data starting to be sent by the interactive application server from the playback moment; and receive, if the playback moment is not the snapshot sending moment, from the data providing server, object interaction data starting to be sent by the interactive application server from the snapshot sending moment closest to the playback moment.

As can be known from the examples of the present disclosure in the foregoing embodiments, by means of a manner for synchronizing a server and a client, an interactive application server sends scenario resource data and periodically generated snapshot data to a data providing server, and the data providing server sequentially sends the scenario resource data, the snapshot data, and object interaction data to a data display client, to ensure that a user can operate the data display client at any time to initiate data display. The data display client may create an interactive scenario according to the scenario resource data after receiving the scenario resource data, may load the snapshot data in the interactive scenario after receiving the snapshot data, and may simulate an object interaction process in the interactive scenario according to the object interaction data after receiving the object interaction data. In one embodiment of the present disclosure, the interactive application server divides the data in the interactive scenario into three different types of data, and each type of data is sequentially loaded. Therefore, the data display client may rapidly restore interactions of simulation objects in the interactive scenario, so that the user may smoothly view interaction processes of the simulation objects in the interactive scenario, to resolve the problem in the existing technology that the client needs to wait for an excessively long time.

Figure 14:
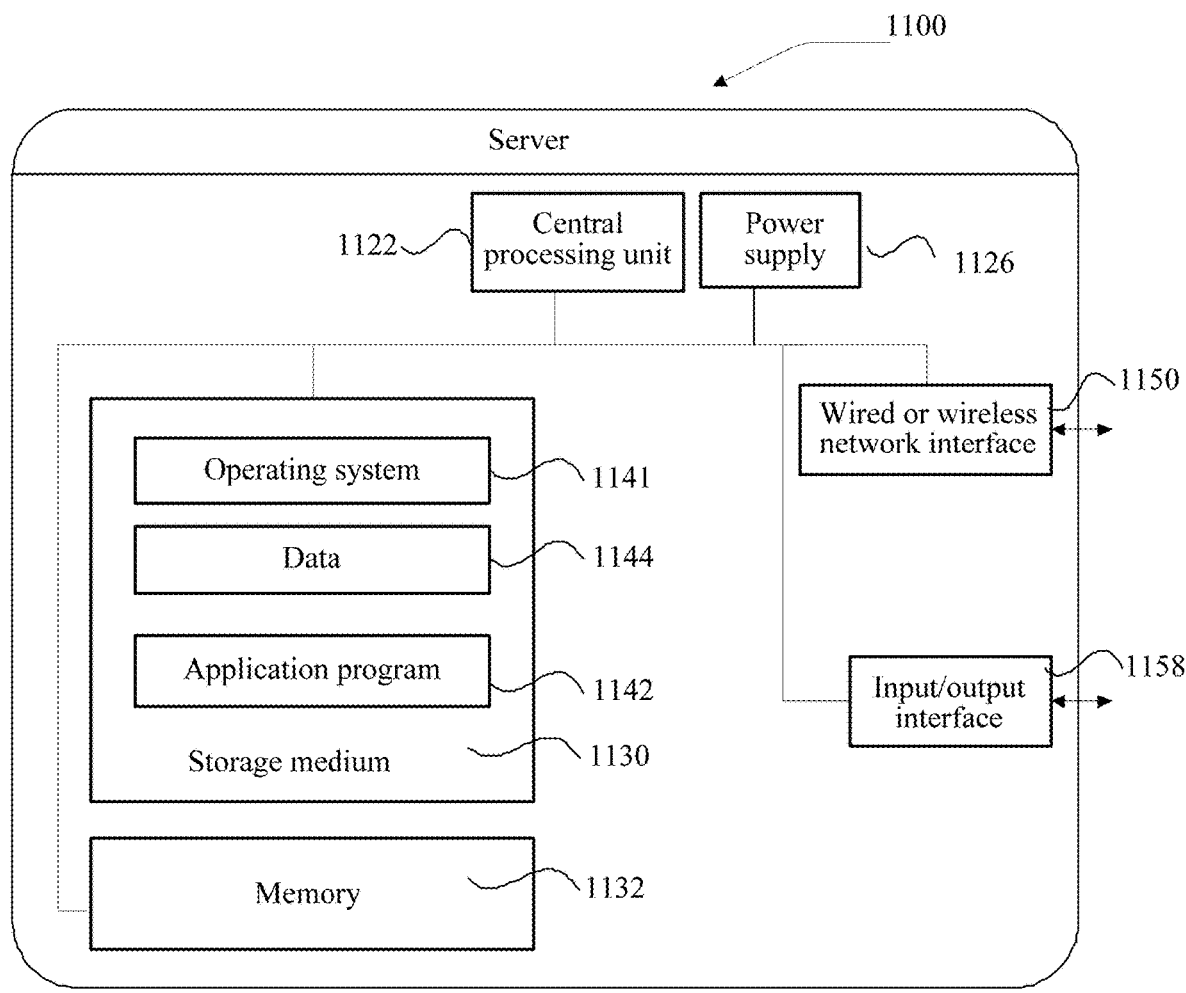
FIG. 14 is a schematic diagram of a composition structure of another data providing server according to an embodiment of the present disclosure.

FIG. 14 is a schematic structural diagram of a server according to an embodiment of the present disclosure. The server 1100 may be specifically the data providing server in the foregoing embodiment. The server 1100 may greatly vary due to different configurations or performances, and may include one or more central processing units (CPU) 1122 (for example, one or more processors) and a memory 1132, one or more storage media 1130 (for example, one or more mass storage devices) for storing application programs 1142 or data 1144. The memory 1132 and the storage medium 1130 may be transient or persistent storages. A program stored in the storage medium 1130 may include one or more modules (not shown), and each module may include a series of instructions and operations for the server. Still further, the CPU 1122 may be configured to communicate with the storage medium 1130, and perform, on the server 1100, a series of instructions and operations in the storage medium 1130.

The server 1100 may further include one or more power supplies 1126, one or more wired or wireless network interfaces 1150, one or more input/output interfaces 1158, and/or one or more operating systems 1141, for example, Windows Server™, Mac OS X™, Unix™, Linux™, or FreeBSD™.

The steps performed by the data providing server in the foregoing method embodiments may be based on the server structure shown in FIG. 14.

The CPU 1122 is further configured to enable the server to perform the method actually performed by the data providing server in the foregoing method embodiments.

An embodiment of the present disclosure further provides a computer storage medium, the computer readable storage medium stores instructions, and when being run on the computer, the instructions enable the computer to perform the method performed by the data providing server in the foregoing method embodiments.

This disclosure further provides a computer program product including instructions, and when being run on a computer, the instructions enable the computer to perform the method performed by the data providing server in the foregoing method embodiments.

This disclosure further provides a computer program product including instructions, and when being run on a computer, the instructions enable the computer to perform the method actually performed by the data providing server in the foregoing method embodiments.

Figure 15:
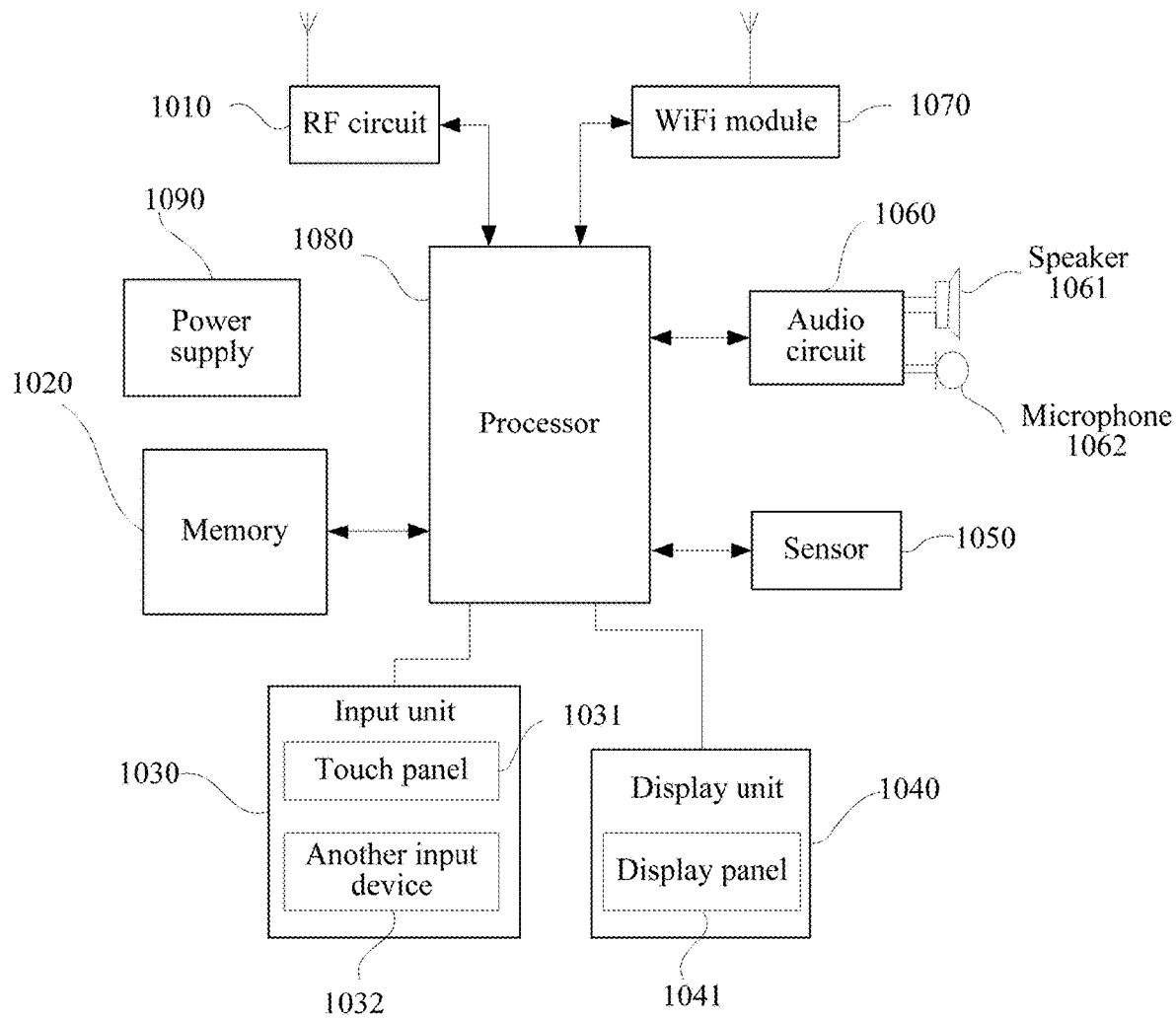
FIG. 15 is a schematic diagram of a composition structure of another data display client according to an embodiment of the present disclosure.

An embodiment of the present disclosure further provides another terminal, and the terminal includes the data display client in the foregoing embodiment. As shown in FIG. 15, for ease of description, FIG. 15 only shows a part related to the embodiments of the present disclosure. For specific technical details not disclosed, refer to the part of the method in the embodiments of the present disclosure. The terminal may be any terminal device including a mobile phone, a tablet computer, a personal digital assistant (PDA), a point of sales (POS), and an in-vehicle computer. An example in which the terminal is a mobile phone is used.

FIG. 15 is a block diagram of a structure of a part of a mobile phone related to a terminal according to an embodiment of the present disclosure. Referring to FIG. 15, the mobile phone includes components such as a radio frequency (RF) circuit 1010, a memory 1020, an input unit 1030, a display unit 1040, a sensor 1050, an audio circuit 1060, a wireless fidelity (WiFi) module 1070, a processor 1080, and a power supply 1090. A person skilled in the art may understand that the structure of the mobile phone shown in FIG. 15 does not constitute a limitation to the mobile phone, and the mobile phone may include more components or fewer components than those shown in the figure, or some components may be combined, or a different component deployment may be used.

The following specifically describes the components of the mobile phone with reference to FIG. 15.

The RF circuit 1010 may be configured to receive and send a signal during an information receiving and sending process or a call process. Specifically, the RF circuit receives downlink information from a base station, then delivers the downlink information to the processor 1080 for processing, and sends related uplink data to the base station. Generally, the RF circuit 1010 includes, but is not limited to, an antenna, at least one amplifier, a transceiver, a coupler, a low noise amplifier (LNA), and a duplexer. In addition, the RF circuit 1010 may also communicate with a network and another device by wireless communication. The wireless communication may use any communication standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 1020 may be configured to store a software program and module. The processor 1080 runs the software program and module stored in the memory 1020, to implement various functional applications and data processing of the mobile phone. The memory 1020 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 1020 may include a high-speed random-access memory, and may further include a non-volatile memory, such as at least one magnetic disk storage device, a flash memory, or other volatile solid-state storage devices.

The input unit 1030 may be configured to receive input digit or character information, and generate a keyboard signal input related to user setting and function control of the mobile phone. Specifically, the input unit 1030 may include a touch panel 1031 and another input device 1032. The touch panel 1031, which may also be referred to as a touchscreen, may collect a touch operation of a user on or near the touch panel (such as an operation of a user on or near the touch panel 1031 by using any suitable object or accessory such as a finger or a stylus), and drive a corresponding connection apparatus according to a preset program. Optionally, the touch panel 1031 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 1080. Moreover, the touch controller can receive and execute a command sent by the processor 1080. In addition, the touch panel 1031 may be a resistive, capacitive, infrared, or surface sound wave type touch panel. In addition to the touch panel 1031, the input unit 1030 may further include another input device 1032. Specifically, another input device 1032 may include, but is not limited to, one or more of a physical keyboard, a functional key (such as a volume control key or a switch key), a track ball, a mouse, and a joystick.

The display unit 1040 may be configured to display information input by the user or information provided for the user, and various menus of the mobile phone. The display unit 1040 may include a display panel 1041. Optionally, the display panel 1041 may be configured by using a liquid crystal display (LCD), an organic light-emitting diode (OLED), or the like. Further, the touch panel 1031 may cover the display panel 1041. After detecting a touch operation on or near the touch panel 1031, the touch panel 1031 transfers the touch operation to the processor 1080, so as to determine a type of a touch event. Then, the processor 1080 provides corresponding visual output on the display panel 1041 according to the type of the touch event. Although, in FIG. 15, the touch panel 1031 and the display panel 1041 are used as two separate parts to implement input and output functions of the mobile phone, in some embodiments, the touch panel 1031 and the display panel 1041 may be integrated to implement the input and output functions of the mobile phone.

The mobile phone may further include at least one sensor 1050 such as an optical sensor, a motion sensor, and other sensors. Specifically, the optical sensor may include an ambient light sensor and a proximity sensor. The ambient light sensor may adjust luminance of the display panel 1041 according to brightness of the ambient light. The proximity sensor may switch off the display panel 1041 and/or backlight when the mobile phone is moved to an ear. As one type of motion sensor, an acceleration sensor may detect magnitude of accelerations in various directions (generally on three axes), may detect magnitude and a direction of the gravity when static, and may be applied to an application that recognizes an attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 1060, a speaker 1061, and a microphone 1062 may provide audio interfaces between the user and the mobile phone. The audio circuit 1060 may convert received audio data into an electric signal and transmit the electric signal to the speaker 1061. The speaker 1061 converts the electric signal into a sound signal for output. On the other hand, the microphone 1062 converts a collected sound signal into an electric signal. The audio circuit 1060 receives the electric signal and converts the electric signal into audio data, and outputs the audio data to the processor 1080 for processing. Then, the processor 1080 sends the audio data to, for example, another mobile phone by using the RF circuit 1010, or outputs the audio data to the memory 1020 for further processing.

WiFi is a short distance wireless transmission technology. The mobile phone may help, by using the WiFi module 1070, the user to receive and send e-mails, browse a web page, access streaming media, and so on, which provides wireless broadband Internet access for the user. Although FIG. 15 shows the WiFi module 1070, it may be understood that the WiFi module 1070 is not a necessary component of the mobile phone, and when required, the WiFi module 1070 may be omitted as long as the scope of the essence of the present disclosure is not changed.

The processor 1080 is a control center of the mobile phone, and is connected to various parts of the mobile phone by using various interfaces and lines. By running or executing the software program and/or module stored in the memory 1020, and invoking data stored in the memory 1020, the processor 1080 performs various functions and data processing of the mobile phone, thereby performing overall monitoring on the mobile phone. Optionally, the processor 1080 may include one or more processing units. Preferably, the processor 1080 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1080.

The mobile phone further includes the power supply 1090 (such as a battery) for supplying power to the components. Preferably, the power supply may be logically connected to the processor 1080 by using a power management system, thereby implementing functions such as charging, discharging and power consumption management by using the power management system.

Although not shown, the mobile phone may further include a camera, a Bluetooth module, and the like, which are not further described herein.

In one embodiment of the present disclosure, the processor 1080 included in the terminal further controls a method process performed by the data display client in the foregoing method embodiment.

The embodiments of the present disclosure further provide a computer storage medium, the computer readable storage medium stores instructions, when being run on a computer, the instructions enable the computer to perform the method actually performed by the data display client in the foregoing method embodiment.

This disclosure further provides a computer program product including instructions, and when being run on a computer, the instructions enable the computer to perform the method actually performed by the data display client in the foregoing method embodiment.

In addition, it should be noted that, the foregoing described apparatus embodiments are merely exemplary. The units described as separate parts may or may not be physically separate, and the parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the present disclosure, connection relationships between modules indicate that the modules have communication connections with each other, which may be specifically implemented as one or more communications buses or signal cables. A person of ordinary skill in the art may understand and implement the embodiments of the present disclosure without creative efforts.

Based on the foregoing descriptions of the embodiments, a person skilled in the art may clearly understand that the present disclosure may be implemented by software in addition to necessary universal hardware or by dedicated hardware only, including a dedicated integrated circuit, a dedicated CPU, a dedicated memory, a dedicated component and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation in most cases. Based on this, the technical solutions of the present disclosure or the part that makes contributions to the prior art can be substantially embodied in the form of a software product. The computer software product is stored in a readable storage medium, for example, a floppy disk, a USB flash drive, a removable hard disk, a read-only memory (ROM), a random access memory (RAM), a magnetic disk, or an optical disc of the computer, and includes several instructions used to instruct a computer device (for example, a personal computer, a server, or a network device) to perform the methods according to the embodiments of the present disclosure.

The above embodiments are merely provided for describing the technical solutions of the present disclosure, but not intended to limit the present disclosure. It should be understood by a person of ordinary skill in the art that although the present disclosure has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present disclosure.

What is claimed is:

1. A processing method for displaying data, comprising:
receiving, by a data providing server, scenario resource data sent by an interactive application server after an interactive scenario is created, the scenario resource data being basic data for creating the interactive scenario;
periodically receiving, by the data providing server, snapshot data sent by the interactive application server, each snapshot data being generated by the interactive application server according to a full-object status in the interactive scenario and corresponding to a snapshot sending moment, the full-object status including attributes of objects displayed in the interactive scenario;
receiving, by the data providing server, a data load request sent by a data display client, the data load request comprising a playback moment;
determining a snapshot data according to the playback moment, the snapshot sending moment of the determined snapshot data being the same as or closest to the playback moment;
sending, by the data providing server, the scenario resource data and the snapshot data to the data display client according to the data load request; and
sending, by the data providing server, after buffering object interaction data generated by the interactive application server, the object interaction data to the data display client, the object interaction data being real-time network uplink and downlink data generated based on interaction behaviors of the objects in the interactive scenario.

2. The method according to claim 1, wherein:
the data providing server receives, at a first moment, the data load request sent by the data display client, and
the sending, by the data providing server, the scenario resource data to the data display client according to the data load request comprises:
sending, by the data providing server, the scenario resource data to the data display client in real time after receiving the data load request at the first moment.

3. The method according to claim 2, wherein the sending, by the data providing server, the snapshot data to the data display client comprises:
determining, by the data providing server, whether the first moment is a snapshot sending moment at which the interactive application server sends snapshot data;
when it is determined that the first moment is the snapshot sending moment, sending, by the data providing server, to the data display client, the snapshot data sent by the interactive application server at the first moment;
when it is determined that the first moment is not the snapshot sending moment, starting, by the data providing server, to wait from the first moment until receiving snapshot data sent by the interactive application server at a closest snapshot sending moment after the first moment; and
sending, by the data providing server, to the data display client, the snapshot data sent by the interactive application server at the closest snapshot sending moment after the first moment.

4. The method according to claim 1, wherein:
the data providing server receives, at a second moment, the data load request that comprises the playback moment and that is sent by the data display client, the playback moment is earlier than the second moment; and the sending, by the data providing server, the snapshot data to the data display client comprises:

determining, by the data providing server, whether the playback moment is a snapshot sending moment at which the interactive application server sends snapshot data;

when it is determined that the playback moment is the snapshot sending moment, sending, by the data providing server, to the data display client, the snapshot data sent by the interactive application server at the playback moment;

when it is determined that the playback moment is not the snapshot sending moment, starting, by the data providing server, to backtrack a timeline from the playback moment, finding a snapshot sending moment closest to the playback moment, obtaining snapshot data sent by the interactive application server at the snapshot sending moment closest to the playback moment, the closest snapshot sending moment being earlier than the playback moment; and sending to the data display client, by the data providing server, the snapshot data sent by the interactive application server at the snapshot sending moment closest to the playback moment.

5. The method according to claim 4, wherein the sending, by the data providing server, the object interaction data to the data display client comprises:

when it is determined that the playback moment is the snapshot sending moment, sending to the data display client, by the data providing server, object interaction data sent by the interactive application server starting from the playback moment; and when it is determined that the playback moment is not the snapshot sending moment, sending to the data display client, by the data providing server if, object interaction data sent by the interactive application server starting from the snapshot sending moment closest to the playback moment.

6. The method according to claim 1, further comprising:

sending, by the data display client, the data load request to the data providing server;

receiving, by the data display client, the scenario resource data sent by the data providing server, and creating the interactive scenario according to the scenario resource data;

receiving, by the data display client, the snapshot data sent by the data providing server, and loading the snapshot data in the interactive scenario; and receiving, by the data display client, the object interaction data sent by the data providing server, and simulating an object interaction process in the interactive scenario according to the object interaction data.

7. The method according to claim 6, wherein:

the data providing server receives, at a first moment, the data load request sent by the data display client, and the receiving, by the data display client, the snapshot data sent by the data providing server comprises:

when the first moment is a snapshot sending moment, receiving from the data providing server, by the data display client, snapshot data sent by the interactive application server at the first moment; and when the first moment is not the snapshot sending moment, receiving from the data providing server, by the data display client, snapshot data sent by the interactive application server at a closest snapshot sending moment after the first moment.

8. The method according to claim 6, wherein the sending, by the data display client, the data load request to a data providing server comprises:

sending, by the data display client, the data load request including the playback moment to the data providing server; and when the data providing server receives the data load request comprising the playback moment at a second moment, the receiving, by the data display client, snapshot data sent by the data providing server comprises:

when the playback moment is the snapshot sending moment, receiving from the data providing server, by the data display client, snapshot data sent by the interactive application server at the playback moment; and when the playback moment is not the snapshot sending moment, receiving from the data providing server, by the data display client, the snapshot data sent by the interactive application server at a snapshot sending moment closest to the playback moment, the closest snapshot sending moment being earlier than the playback moment.

9. The method according to claim 8, wherein the receiving, by the data display client, the object interaction data sent by the data providing server comprises:

when the playback moment is the snapshot sending moment, receiving from the data providing server, by the data display client, object interaction data sent by the interactive application server starting from the playback moment; and when the playback moment is not the snapshot sending moment, receiving from the data providing server, by the data display client, object interaction data sent by the interactive application server starting from the snapshot sending moment closest to the playback moment.

10. A data providing server for displaying data, comprising:

a memory storing computer program instructions; and a processor coupled to the memory and, when executing the computer program instructions, configured to perform:

receiving scenario resource data sent by an interactive application server after an interactive scenario is created, the scenario resource data being basic data for creating the interactive scenario;

periodically receiving snapshot data sent by the interactive application server, each snapshot data being generated by the interactive application server according to a full-object status in the interactive scenario and corresponding to a snapshot sending moment, the full-object status including attributes of objects displayed in the interactive scenario;

receiving a data load request sent by a data display client, the data load request comprising a playback moment;

determining a snapshot data according to the playback moment, the snapshot sending moment of the determined snapshot data being the same as or closest to the playback moment;

sending the scenario resource data and the determined snapshot data to the data display client according to the data load request; and sending, after buffering object interaction data generated by the interactive application server, the object interaction data to the data display client, the object interaction data being real-time network uplink and downlink data generated based on interaction behaviors of the objects in the interactive scenario.

11. The processing system according to claim 10, wherein the data providing server receives, at a first moment, the data load request, and the receiving snapshot data sent by the data providing server comprises:
when the first moment is a snapshot sending moment, receiving from the data providing server snapshot data sent by the interactive application server at the first moment; and
when the first moment is not the snapshot sending moment, receiving from the data providing server snapshot data sent by the interactive application server at a closest snapshot sending moment after the first moment.

12. The processing system according to claim 10, wherein the sending a data load request to a data providing server comprises:
sending the data load request including the playback moment to the data providing server; and
when the data providing server receives the data load request comprising the playback moment at a second moment, the receiving snapshot data sent by the data providing server comprises:
when the playback moment is the snapshot sending moment, receiving from the data providing server snapshot data sent by the interactive application server at the playback moment; and
when the playback moment is not the snapshot sending moment, receiving from the data providing server snapshot data sent by the interactive application server at a snapshot sending moment closest to the playback moment, the closest snapshot sending moment being earlier than the playback moment.

13. The processing system according to claim 12, wherein the receiving object interaction data sent by the data providing server comprises:
when the playback moment is the snapshot sending moment, receiving from the data providing server object interaction data sent by the interactive application server starting from the playback moment; and
when the playback moment is not the snapshot sending moment, receiving from the data providing server object interaction data sent by the interactive application server starting from the snapshot sending moment closest to the playback moment.

14. The processing system according to claim 10, wherein the data providing server is configured to perform:
receiving, at a first moment, the data load request sent by the data display client, and
sending, by the data providing server, the scenario resource data to the data display client in real time after receiving the data load request at the first moment.

15. The processing system according to claim 14, wherein the data providing server is further configured to perform:
determining whether the first moment is a snapshot sending moment at which the interactive application server sends snapshot data;
when it is determined that the first moment is the snapshot sending moment, sending, to the data display client, the snapshot data sent by the interactive application server at the first moment;
when it is determined that the first moment is not the snapshot sending moment, starting to wait from the first moment until receiving snapshot data sent by the interactive application server at a closest snapshot sending moment after the first moment; and sending, to the data display client, the snapshot data sent by the interactive application server at the closest snapshot sending moment after the first moment.

16. The processing system according to claim 10, wherein the data providing server is configured to perform:
receiving the data load request that comprises the playback moment and that is sent by the data display client, the playback moment is earlier than the second moment; and
determining whether the playback moment is a snapshot sending moment at which the interactive application server sends snapshot data;
when it is determined that the playback moment is the snapshot sending moment, sending, to the data display client, the snapshot data sent by the interactive application server at the playback moment;
when it is determined that the playback moment is not the snapshot sending moment, starting to backtrack a timeline from the playback moment, finding a snapshot sending moment closest to the playback moment, obtaining snapshot data sent by the interactive application server at the snapshot sending moment closest to the playback moment, the closest snapshot sending moment being earlier than the playback moment; and
sending to the data display client, the snapshot data sent by the interactive application server at the snapshot sending moment closest to the playback moment.

17. A non-transitory computer-readable storage medium storing computer program instructions executable by at least one processor of a data providing server to perform:
receiving scenario resource data sent by an interactive application server after an interactive scenario is created, the scenario resource data being basic data for creating the interactive scenario;
periodically receiving snapshot data sent by the interactive application server, each snapshot data being generated by the interactive application server according to a full-object status in the interactive scenario and corresponding to a snapshot sending moment, the full-object status including attributes of objects displayed in the interactive scenario;
receiving a data load request sent by a data display client, the data load request comprising a playback moment;
determining a snapshot data according to the playback moment, the snapshot sending moment of the determined snapshot data being the same as or closest to the playback moment;
sending the scenario resource data and the determined snapshot data to the data display client according to the data load request; and
sending, after buffering object interaction data generated by the interactive application server, the object interaction data to the data display client, the object interaction data being real-time network uplink and downlink data generated based on interaction behaviors of the objects in the interactive scenario.

18. The storage medium according to claim 17, wherein the sending, by a data display client, a data load request to a data providing server comprises:
sending, by the data display client, the data load request including the playback moment to the data providing server; and
when the data providing server receives the data load request comprising the playback moment at a second moment, the receiving, by the data display client, snapshot data sent by the data providing server comprises:

when the playback moment is the snapshot sending moment, receiving from the data providing server, by the data display client, snapshot data sent by the interactive application server at the playback moment; and when the playback moment is not the snapshot sending moment, receiving from the data providing server, by the data display client, snapshot data sent by the interactive application server at a snapshot sending moment closest to the playback moment, the closest snapshot sending moment being earlier than the playback moment.

19. The storage medium according to claim 18, wherein the receiving, by the data display client, object interaction data sent by the data providing server comprises:

when the playback moment is the snapshot sending moment, receiving from the data providing server, by the data display client, object interaction data sent by the interactive application server starting from the playback moment; and when the playback moment is not the snapshot sending moment, receiving from the data providing server, by the data display client, object interaction data sent by the interactive application server starting from the snapshot sending moment closest to the playback moment.

20. The method according to claim 1, wherein the interactive scenario is a game scenario, the objects are game objects, and the scenario resource data, the snapshot data, and the object interaction data are used by the data display client to simulate a game event in the interactive scenario.

\* \* \* \* \*